( 12 ) United States Patent
Ishibashi et al.

(10) Patent No.: US 11,955,642 B2
(45) Date of Patent: Apr. 9, 2024

(54) ELECTRODE, SECONDARY BATTERY, BATTERY PACK, AND VEHICLE

(71) Applicant: KABUSHIKI KAISHA TOSHIBA, Tokyo (JP)

(72) Inventors: Mitsuru Ishibashi, Kanagawa (JP); Wen Zhang, Sagamihara Kanagawa (JP); Kazuomi Yoshima, Kanagawa (JP); Keigo Hoshina, Kanagawa (JP); Norio Takami, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 299 days.

(21) Appl. No.: 17/007,116

(22) Filed: Aug. 31, 2020

(65) Prior Publication Data

US 2021/0296653 A1 Sep. 23, 2021

(30) Foreign Application Priority Data

Mar. 23, 2020 (JP) .................................. 2020-050443

(51) Int. Cl.
| | | |
|---|---|---|
| *H01M 4/66* | (2006.01) | |
| *H01M 4/02* | (2006.01) | |
| *H01M 4/131* | (2010.01) | |
| *H01M 4/133* | (2010.01) | |
| *H01M 4/134* | (2010.01) | |
| *H01M 4/36* | (2006.01) | |

(Continued)

(52) U.S. Cl.
CPC ........... *H01M 4/662* (2013.01); *H01M 4/131* (2013.01); *H01M 4/133* (2013.01); *H01M 4/134* (2013.01);
(Continued)

(58) Field of Classification Search
CPC ... H01M 4/64–668; H01M 4/131–134; H01M 2004/021–028; H01M 4/36–366;
(Continued)

(56) References Cited

U.S. PATENT DOCUMENTS

| | | | | |
|---|---|---|---|---|
| 2011/0014521 A1* | 1/2011 | Matsuyama | ...... | H01M 10/0525 |
| | | | | 429/217 |
| 2014/0248537 A1* | 9/2014 | Hayashi | ................ | H01M 4/485 |
| | | | | 536/56 |

(Continued)

FOREIGN PATENT DOCUMENTS

| | | |
|---|---|---|
| JP | 2004-352605 A | 12/2004 |
| JP | 2017-130451 A1 | 7/2017 |

(Continued)

OTHER PUBLICATIONS

Daiichi Kogyo Seiyaku Co., Ltd. (2017, Nov. 15). Product Information—Rheocrysta. Retrieved Oct. 27, 2022, from https://www.dks-web.co.jp/product/rheocrysta/index.html (Year: 2017).*

(Continued)

*Primary Examiner* — Mayla Gonzalez Ramos
*Assistant Examiner* — Bethany C Garcia
(74) *Attorney, Agent, or Firm* — Foley & Lardner LLP

(57) ABSTRACT

According to one embodiment, an electrode includes a current collector and an active material-containing layer. The active material-containing layer includes an active material, a conductive agent, and cellulose fiber. The conductive agent includes carbon fiber. The active material-containing layer includes a first surface brought into contact with the current collector, and a second surface. 2000/mm² or less of first agglomerates are present on the second surface. Each of the first agglomerates includes at least one of the carbon fiber or the cellulose fiber, and does not include the active material. Each of the first agglomerates has a longest diameter of 5 μm or more and a shortest diameter of 1 μm or more.

14 Claims, 8 Drawing Sheets

(51) Int. Cl.
*H01M 10/0525* (2010.01)
*H01M 50/20* (2021.01)

(52) U.S. Cl.
CPC ....... *H01M 4/366* (2013.01); *H01M 10/0525* (2013.01); *H01M 50/20* (2021.01); *H01M 2004/021* (2013.01); *H01M 2004/027* (2013.01); *H01M 2004/028* (2013.01); *H01M 2220/20* (2013.01)

(58) Field of Classification Search
CPC ........... H01M 4/624–625; H01M 4/62; H01M 4/364; H01M 4/587; H01M 4/622; H01M 50/44; H01M 50/4295; H01M 2220/20; H01M 2004/027; H01M 4/485; H01M 4/133; H01M 4/525; H01M 4/02; H01M 4/66; H01M 10/0525; Y02E 60/10; C01G 33/00–006; C01G 23/00; C01G 23/003–006; Y02T 10/70; C09D 7/61; Y02P 70/50; B60L 50/64; C08K 3/04; C08K 3/00; C08L 1/08; C08L 1/286; H01G 11/06; C01B 32/174; C08B 15/00; C09K 23/00; H01B 1/04; H01B 1/24
See application file for complete search history.

(56) References Cited

U.S. PATENT DOCUMENTS

| | | | |
|---|---|---|---|
| 2018/0083310 A1* | 3/2018 | Iwasaki | H01M 10/425 |
| 2018/0175370 A1* | 6/2018 | Kim | H01M 4/13 |
| 2018/0241083 A1 | 8/2018 | Takami et al. | |
| 2019/0198876 A1 | 6/2019 | Takami | |
| 2022/0200003 A1* | 6/2022 | Sofue | H01M 4/622 |

FOREIGN PATENT DOCUMENTS

| | | |
|---|---|---|
| JP | 2018-137097 A | 8/2018 |
| JP | 2018-534731 A | 11/2018 |
| JP | 2020-038818 A | 3/2020 |
| JP | 2020-177849 A | 10/2020 |
| WO | WO-2019/171906 A1 | 9/2019 |
| WO | WO-2019198429 A1 * | 10/2019 |
| WO | WO-2021153590 A1 * | 8/2021 |

OTHER PUBLICATIONS

English translation of (N)—WO 2021153590 A1 (Aug. 2021).*
English translation of (O)—WO 2019198429 (Oct. 2019).*

* cited by examiner

Example 1

Comparative example 1

ELECTRODE, SECONDARY BATTERY, BATTERY PACK, AND VEHICLE

CROSS-REFERENCE TO RELATED APPLICATION(S)

This application is based upon and claims the benefit of priority from the Japanese Patent Application No. 2020-050443, filed Mar. 23, 2020, the entire contents of which are incorporated herein by reference.

FIELD

Embodiments described herein relate generally to an electrode, a secondary battery, a battery pack, and a vehicle.

BACKGROUND

In recent years, titanium-containing oxides, such as lithium titanate ($Li_4Ti_5O_{12}$), have gained attention as a negative electrode active material. Titanium-containing oxides exhibit excellent safety and cycle performance, as compared with carbon materials, such as graphite, that have been conventionally adopted as a negative electrode active material. However, lithium titanate is less likely to increase an energy density of an electrode. Accordingly, niobium-titanium composite oxide, which has a higher capacity than lithium titanate and exhibits excellent output performance and life performance, has been under consideration.

DETAILED DESCRIPTION

Figure 1:
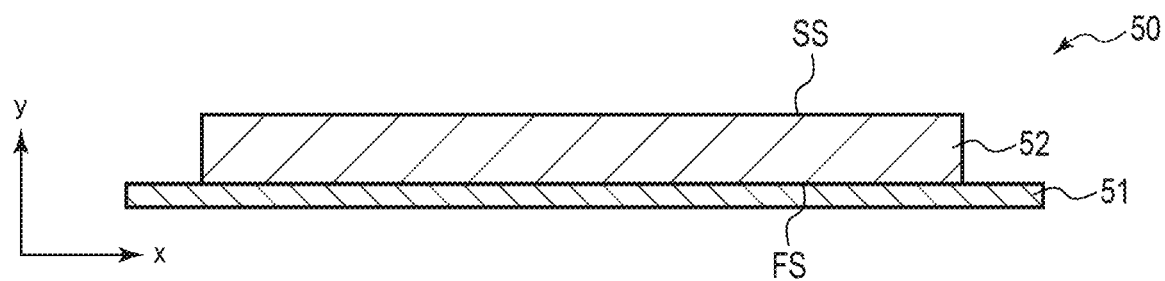
FIG. 1 is a cross-sectional view schematically showing an example of an electrode according to the embodiment.

According to one embodiment, an electrode includes a current collector and an active material-containing layer supported on the current collector. The active material-containing layer includes an active material, a conductive agent, and cellulose fiber. The conductive agent includes carbon fiber. The active material-containing layer includes a first surface brought into contact with the current collector, and a second surface which is a reverse face of the first surface. $2000/mm^2$ or less of first agglomerates are present on the second surface. Each of the first agglomerates includes at least one of the carbon fiber or the cellulose fiber. Each of the first agglomerates does not include the active material. Each of the first agglomerates has a longest diameter of 5 μm or more and a shortest diameter of 1 μm or more.

According to another embodiment, a secondary battery includes a positive electrode, a negative electrode, and an electrolyte. At least one of the positive electrode or the negative electrode is the electrode according to the embodiment.

According to another embodiment, a battery pack includes the secondary battery according to the embodiment.

According to another embodiment, a vehicle includes the battery pack according to the embodiment.

Niobium-titanium composite oxide has relatively low conductivity. As a measure to compensate for this drawback, for example, carbon fiber such as carbon nanotube is contained in an electrode. As compared with granular carbon such as carbon black, carbon fiber has many contact points with active material particles and can provide a conductive path over a long distance. Therefore, the electron conductivity of the electrode can be enhanced. However, carbon fiber is difficult to disperse uniformly in an active material-containing layer, causing a drop in the cycle performance. Through intensive research, the inventors have found that containing cellulose fiber in an active material-containing layer can enhance the dispersiveness of the carbon fiber.

First Embodiment

According to a first embodiment, an electrode is provided. The electrode includes a current collector and an active material-containing layer. The active material-containing layer is supported on the current collector. The active material-containing layer contains an active material, a conductive agent including carbon fiber, and cellulose fiber. The active material-containing layer includes a first surface brought into contact with the current collector, and a second surface which is a reverse face of the first surface. The number of first agglomerates on the second surface is $2000/mm^2$ or less. The first agglomerate is a portion including at least one of the carbon fiber or the cellulose fiber and not including the active material, and is a portion having a longest diameter of 5 μm or more and a shortest diameter of 1 μm or more. Here, the shortest diameter is set to 1 μm or more, so that the favorably dispersed conductive agent and the cellulose fiber are distinguished from the first agglomerate.

FIG. 1 is a cross-sectional view schematically showing an example of the electrode according to the embodiment. The x-axis direction is a short-side direction of an electrode 50, and the y-axis direction is a height direction of the electrode 50. The x-axis direction and y-axis direction are orthogonal to each other. The electrode 50 shown in FIG. 1 includes a current collector 51, and an active material-containing layer 52 supported on one surface of the current collector 51. The active material-containing layer 52 includes a first surface FS brought into contact with the current collector 51, and a second surface SS which is a reverse face of the first surface FS. The second surface SS is a surface that may face a counter electrode or an electrically insulating film (electrically insulating layer) such as a separator.

The first agglomerate may include the carbon fiber, the cellulose fiber, or a mixture thereof. The first agglomerate may further include a binder. The first agglomerate may include a conductive agent other than the carbon fiber.

The number of first agglomerates on the second surface SS being 2000/mm$^2$ or less indicates that agglomeration of the carbon fiber is sufficiently suppressed on the second surface SS so that the carbon fiber is favorably dispersed. That is, the cellulose fiber can enhance the dispersiveness of the carbon fiber in the active material-containing layer 52 by intricately intersecting with the carbon fiber. Thus, the agglomeration of the carbon fiber on the surface of the electrode 50 can be suppressed. As a result, the conductivity of the active material-containing layer 52 is enhanced, and the cycle performance is enhanced.

The number of first agglomerates on the second surface SS is preferably 1600/mm$^2$ or less, and more preferably 1300/mm$^2$ or less. The lower limit of the number of first agglomerates on the second surface SS is not particularly fixed; however, it may be 0/mm$^2$ or more as one example, and may be 400/mm$^2$ or more as another example.

The second agglomerate is a portion including at least one of the carbon fiber or the cellulose fiber and not including the active material, and is a portion having a longest diameter of 2 μm or more and a shortest diameter of 1 μm or more. Therefore, the second agglomerate may include the carbon fiber, the cellulose fiber, or a mixture thereof. The second agglomerate may further include a binder. The second agglomerate may include a conductive agent other than the carbon fiber. The second agglomerate preferably includes the carbon fiber. As a result, the conductivity of the active material-containing layer is enhanced, and the cycle performance is enhanced.

The number of second agglomerates on the first surface FS is preferably larger than the number of first agglomerates on the second surface SS. The active material-containing layer 52 configured as described above has high electron conductivity in the Y-axis direction and can further enhance the cycle performance of batteries.

The number of second agglomerates on the first surface FS is preferably 4500/mm$^2$ or more. The number of second agglomerates on the first surface FS being 4500/mm$^2$ or more indicates that at least one of the carbon fiber or the cellulose fiber is sufficiently present on the first surface FS. When the second agglomerate including the cellulose fiber is present in large numbers on the first surface FS, the adhesion between the current collector 51 and the active material-containing layer 52 is enhanced. When the second agglomerate including the carbon fiber is present in large numbers on the first surface FS, the electron conductivity of the active material-containing layer 52 is enhanced. That is, the carbon fiber may concentrate on the second surface SS side at the time of electrode formation. Since the cellulose fiber intricately intersects with the carbon fiber, movement of the carbon fiber can be suppressed, so that the carbon fiber can also exist on the first surface FS side. As a result, the electron conductivity of the active material-containing layer 52 in the Y-axis direction can be further enhanced.

The number of second agglomerates on the first surface FS is more preferably 6000/mm$^2$ or more. The upper limit of the number of second agglomerates on the first surface FS may be 10000/mm$^2$ or less as one example, and may be 8000/mm$^2$ or less as another example.

Next, an example of a method for measuring the first agglomerate on the second surface will be described.

First, when the electrode is incorporated in a secondary battery, the secondary battery is placed in a discharged state and then disassembled to remove the electrode. The disassembling is conducted in a glove box under an atmosphere of an inert gas such as argon. The discharged state refers to a state in which the battery has been discharged until the state of charge (SOC) thereof becomes 0%. The removed electrode is washed with a solvent, and then dried. Ethyl methyl carbonate, for example, is used for the solvent. The dried electrode is cut into sample pieces.

The surface part of the active material-containing layer of the sample piece is observed using a scanning electron microscope (SEM). The observation is performed at, for example, 2000-fold magnification. The number of first agglomerates within a field of view of the observation is measured. The first agglomerate is a portion including the conductive agent, the cellulose fiber, or a mixture thereof and not including the active material, and is a portion having a longest diameter of 5 μm or more and a shortest diameter of 1 μm or more. A method for measuring the longest and shortest diameters of the first agglomerate will be described with reference to FIG. 2.

Figure 2:
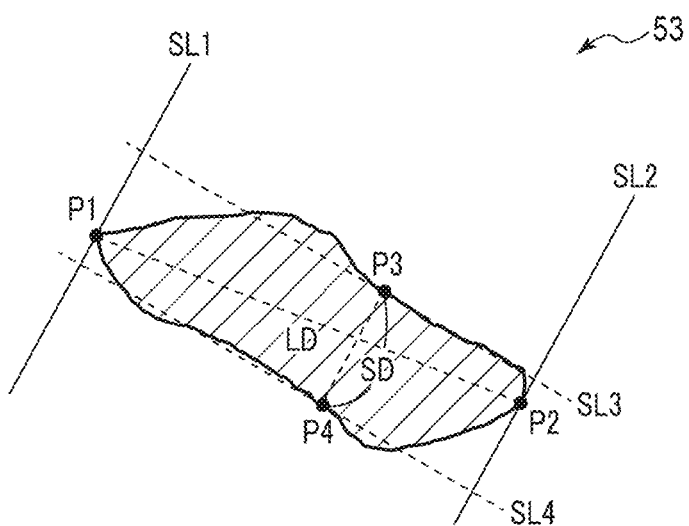
FIG. 2 is a cross-sectional view schematically showing a first agglomerate.

FIG. 2 is a cross-sectional view schematically showing an agglomerate. The longest diameter LD of the agglomerate 53 is a maximum distance between straight lines SL1 and SL2, which are parallel with each other and in contact with the agglomerate 53. The straight lines SL1 and SL2 are in contact with the contour of the agglomerate 53 at P1 and P2, respectively. The line segment between points P1 and P2 that does not intersect the active material is determined as the longest diameter LD of the agglomerate 53. The shortest diameter SD of the agglomerate 53 is a minimum distance between straight lines SL3 and SL4, which are parallel with each other and in contact with the agglomerate 53. The straight lines SL3 and SL4 are in contact with the contour of the agglomerate 53 at P3 and P4, respectively. The line segment between points P3 and P4 that does not intersect the active material is determined as the shortest diameter SD of the agglomerate 53. An agglomerate having a longest diameter LD of 5 μm or more and a shortest diameter SD of 1 μm or more is determined as the first agglomerate, and the number thereof within the field of view of the observation is counted. The number of first agglomerates (count/mm$^2$) is calculated by converting the total number of first agglomerates obtained into the number of first agglomerates per mm$^2$. The measurement of the number of first agglomerates is performed within the field of view of observation where five or more first agglomerates are observed, and an average value of the measurements is determined as the number of first agglomerates (count/mm$^2$) on the second surface.

Next, an example of a method for measuring the second agglomerate on the first surface will be described. First, using an adhesive tape or the like, a current collector is detached from the sample piece obtained by the above-described method. The first surface of the active material-containing layer exposed after the detachment of the current collector is observed using an SEM. The number of second agglomerates within the field of view is counted by the same method as that applied to the first agglomerate except that an agglomerate having a longest diameter of 2 μm or more is adopted as the second agglomerate, so that the number of second agglomerates on the first surface is calculated. The number of second agglomerates on the first surface can be calculated by the same method as that applied for calculating the number of first agglomerates on the second surface.

The electrode according to the embodiment will be detailed below.

The electrode according to the embodiment includes an active material-containing layer and a current collector. The active material-containing layer is supported on at least one surface of the current collector. The active material-containing layer may be supported on one or both surfaces of the current collector. The active material-containing layer may further contain granular carbon as a conductive agent other than carbon fiber, or a binder, or both granular carbon and a binder, in addition to the active material, carbon fiber, and cellulose fiber. When the active material-containing layer is provided on both surfaces of the current collector, the number of first agglomerates on the second surface may be 2000/mm$^2$ or less in the active material-containing layer supported on at least one surface of the current collector.

The electrode according to the embodiment may be used as a negative electrode or as a positive electrode. The electrode is preferably a negative electrode.

(Negative Electrode Active Material)

When the electrode according to the embodiment is used as a negative electrode, a negative electrode active material preferably includes a titanium-containing composite oxide. Examples of the titanium-containing composite oxide include: titanium-based oxides; titanium composite oxides obtained by substituting part of the constituent elements of a titanium-based oxide with a heterogeneous element; lithium titanium oxides; and lithium titanium composite oxides obtained by substituting part of the constituent elements of a lithium titanium oxide with a heterogeneous element.

Examples of the titanium-based oxides include $TiO_2$, and metal composite oxides containing Ti and at least one element selected from the group consisting of P, V, Sn, Cu, Ni, Co, and Fe. $TiO_2$ is preferably $TiO_2(B)$ or a low-crystalline anatase-type oxide having a heat treatment temperature of 300° C. to 500° C.

Examples of the metal composite oxides containing Ti and at least one element selected from the group consisting of P, V, Sn, Cu, Ni, Co, and Fe include $TiO_2$—$P_2O_5$, $TiO_2$—$V_2O_5$, $TiO_2$—$P_2O_5$—$SnO_2$, and $TiO_2$—$P_2O_5$-MeO (where Me is at least one element selected from the group consisting of Cu, Ni, Co, and Fe). The metal composite oxides preferably have a microstructure in which a crystal phase and an amorphous phase coexist, or in which an amorphous phase exists alone. Metal composite oxides having such a microstructure are deemed excellent, especially in terms of cycle performance. Above all, metal composite oxides containing Ti and at least one element selected from the group consisting of P, V, Sn, Cu, Ni, Co, and Fe are preferred.

A monoclinic β-type titanium composite oxide may also be employed as the titanium-based oxide. The monoclinic β-type titanium composite oxide refers to a titanium composite oxide having a crystal structure of monoclinic titanium dioxide. The crystal structure of monoclinic titanium dioxide belongs mainly to a space group C2/m and exhibits a tunnel structure.

As the titanium composite oxide obtained by substituting part of the constituent elements of a titanium-based oxide with a heterogeneous element, niobium-titanium composite oxide (e.g., $TiNb_2O_7$), and niobium-titanium composite oxide into which at least one element selected from the group consisting of B, Na, Mg, Al, Si, S, P, K, Ca, Mo, W, V, Cr, Mn, Co, Ni, and Fe is introduced may be employed.

Niobium-titanium composite oxide particles include monoclinic niobium-titanium composite oxide represented by $Li_xTiM_wNb_{2\pm y}O_{7\pm z}$ (0≤x≤5, 0≤y≤0.5, −0.3≤z≤0.3, and 0≤w≤0.01, where M is at least one metal other than Ti and Nb). M is preferably at least one metal element selected from the group consisting of K and Ta. When a metal element such as K, Ta, or the like is present, it is possible to synthesize the niobium-titanium composite oxide at a low temperature. However, since crystal growth is promoted, the particles of the niobium-titanium composite oxide tend to be rod-shaped. Rod-shaped niobium-titanium composite oxide tends to crack at the time of expansion and contraction accompanying that lithium ions are inserted to and extracted fromit. Cracking of the niobium-titanium composite oxide blocks an electron conduction network between active materials, likely causing a decrease of the cycle life. In the electrode according to the embodiment, a network for electron conduction can be maintained by the carbon fiber even when cracking of the rod-shaped niobium-titanium composite oxide occurs. Therefore, the cycle performance can be improved.

As the lithium titanium oxide, the following may be employed: a lithium titanium oxide represented by $Li_xTiO_2$ (x is 0≤x≤1); $Li_{4+x}Ti_5O_{12}$ having a spinel structure (x is −1≤x≤3); and $Li_{2+x}Ti_3O_7$ having a ramsdellite structure, $Li_{1+x}Ti_2O_4$, $Li_{1.1+x}Ti_{1.8}O_4$, $Li_{1.07+x}Ti_{1.86}O_4$, and $Li_xTiO_2$ (x is 0≤x), preferably $Li_{2+x}Ti_3O_7$ or $Li_{1.1+x}Ti_{1.8}O_4$.

The titanium composite oxide may be an orthorhombic titanium-containing composite oxide. Examples of the orthorhombic titanium-containing composite oxide include a compound represented by $Li_{2+a}+M(I)_{2-b}Ti_{6-c}M(II)_dO_{14+o}$, where M(I) is at least one element selected from the group consisting of Sr, Ba, Ca, Mg, Na, Cs, Rb, and K, and M(II) is at least one element selected from the group consisting of Zr, Sn, V, Nb, Ta, Mo, W, Y, Fe, Co, Cr, Mn, Ni, and Al. The indices in the composition formula are represented by 0≤a≤6, 0≤b<2, 0≤c<6, 0≤d<6, −0.5≤σ≤0.5. A specific example of the orthorhombic titanium-containing composite oxide is $Li_{2+a}Na_2Ti_6O_{14}$ (0≤a≤6).

The active materials described above may be used alone or in the form of a mixture. Whether the particles of the active material take a granular or fibrous shape, favorable performance can be achieved. In the case of the fibrous shape, the fiber diameter is preferably 0.1 μm or less.

An average particle size (diameter) of primary particles of the active material is preferably 2 μm or less, and more preferably 0.5 μm or less. With this particle size, the resistance accompanying diffusion of Li ions or Na ions in the particles is reduced, and performance for large current discharge and rapid charge is improved greatly. The lower limit of the average particle size (diameter) of primary particles is preferably 0.05 μm. By setting the average particle size (diameter) of primary particles to 0.05 μm or more, high crystallinity, and therefore high capacity, can be obtained.

If an active material having an average particle size of primary particles of more than 2 μm is used, the density of the electrode may decrease. If an active material having an average particle size of primary particles of less than 0.05 μm is used, the particles are likely to agglomerate, and the distribution of the electrolyte may become disproportionate, likely causing depletion of the electrolyte in the counter electrode.

The particle size of the active material can be measured by a method described below using a laser diffraction particle size analyzer (SALD-300 manufactured by Shimadzu Corporation). Specifically, a sample in an amount of about 0.1 g, a surfactant, and distilled water in an amount of 1 to 2 mL are added to a beaker, sufficiently stirred, and then poured in a stirring vessel, followed by measurement of a light intensity distribution performed 64 times at two-second intervals using the laser diffraction particle size analyzer, to measure an average particle size of the primary particles of the active material via a method for analyzing particle size distribution data.

The specific surface area of the active material is preferably 3 $m^2/g$ or more and 50 $m^2/g$ or less. The specific surface area of the active material is measured by the BET method with $N_2$ adsorpotion. If an active material having such a specific surface area is used, compatibility with the electrolyte can be further enhanced.

The specific surface area of the active material-containing layer is preferably 3 $m^2/g$ or more and 50 $m^2/g$ or less. If the specific surface area is less than 3 $m^2/g$, compatibility between the active material-containing layer and the electrolyte decreases and an interfacial resistance increases, likely causing degradation of the output performance and the charge-and-discharge performance. On the other hand, if the specific surface area exceeds 50 $m^2/g$, the distribution of the electrolyte may become disproportionate, likely causing insufficiency of the electrolyte in the counter electrode. The specific surface area of the active material-containing layer is more preferably 5 $m^2/g$ to 50 $m^2/g$.

(Positive Electrode Active Material)

When the electrode according to the embodiment is used as a positive electrode, the following may be adopted as a positive electrode active material: a Ni-containing lithium metal oxide; lithium cobalt oxide ($LiCoO_2$); lithium manganese oxide having a spinel structure ($LiMn_2O_4$, $LiMn_{1.5}Ni_{0.5}O_4$); lithium iron phosphate having an olivine crystal structure ($LiFePO_4$, $LiMn_{1-x-y}Fe_xMg_yPO_4$ where <x<0.5 and 0<y<0.5); lithium manganese phosphate ($LiMnPO_4$); lithium iron manganese phosphate ($LiMn_{1-x}Fe_xPO_4$ where 0<x≤0.5); lithium iron sulfate fluoride ($LiFeSO_4F$); lithium nickel manganese oxide having a spinel crystal structure ($LiMn_{1.5}Ni_{0.5}O_4$); graphite into which anion in a nonaqueous electrolyte is inserted; a carbon material; and activated carbon having the capacitance of a capacitor.

Examples of the Ni-containing lithium metal oxide include lithium nickel oxide ($LiNiO_2$), lithium nickel cobalt oxide ($LiNi_aCo_{1-a}O_2$), lithium nickel cobalt aluminum oxide ($LiNi_aCo_bAl_{1-a-b}O_2$), and lithium nickel cobalt manganese oxide ($LiNi_aCo_bMn_{1-a-b}O_2$, $LiNi_aCo_bMn_{1-a-b}O_4$) (0<a<1, 0<b<1, and 0<(1-a-b)<1). When the Ni-containing lithium metal oxide is represented by a general formula of $LiNi_xM_{1-x}O_2$ (where M is at least one metal other than Ni), x is preferably in the range of 0.5 to 1. Since an oxide satisfying this range has a high capacity and a high energy density, high-temperature cycle life performance, high output performance, and safety performance can be greatly enhanced.

$LiFePO_4$ and $LiMn_{1-x}Fe_xPO_4$ are preferred as active materials in terms of the cycle life performance. $LiNi_xM_{1-x}O_2$ (where M is at least one metal other than Ni, and 0.5≤x≤1) is preferred as an active material in terms of the battery capacity.

The particle size of the primary particles of the active material is preferably 1 μm or less, and more preferably 0.01 μm to 0.5 μm. Active materials having such a particle size of primary particles can reduce the influences of the electron conduction resistance and lithium ion diffusion resistance and improve output performance. The primary particles may agglomerate to form secondary particles having a particle size of 30 μm or less.

The specific surface area of the positive electrode active material is preferably 0.1 $m^2/g$ or more and 10 $m^2/g$ or less.

The positive electrode active material having a specific surface area of 0.1 $m^2/g$ or more can secure sufficient sites where Li ions are inserted and extracted. The positive electrode active material having a specific surface area of 10 $m^2/g$ or less is easy to handle during industrial production and can secure good charge-and-discharge cycle performance.

The active material may have a carbonaceous coating on its surface in order to enhance conductivity. The carbonaceous coating is obtained by heat-treating an organic substance as a carbon source under a non-oxidizing atmosphere. The carbonaceous coating preferably contains carbon in an amount of 30 mass % or more and 100 mass % or less. The thickness of the carbonaceous coating is preferably 0.1 nm or more and 25 nm or less. The organic substance as a carbon source is not particularly limited. Examples thereof include not only water-soluble phenolic resins but also higher monohydric alcohols such as hexanol and octanol, unsaturated monohydric alcohols such as allyl alcohol, propynol (propargyl alcohol), and terpineol, and polyvinyl alcohol (PVA).

(Current Collector)

The current collector is made of a metal foil. Typically, the current collector is made of an aluminum foil, an aluminum alloy foil containing an element such as Mg, Ti, Zn, Mn, Fe, Cu, or Si, a copper foil, a stainless foil, or a nickel foil. The metal foil may be carbon-coated. An entire surface of the metal foil or a part of the metal foil in a lattice shape, for example, may be carbon-coated. The thickness of the metal foil is preferably 20 μm or less and more preferably 15 μm or less.

(Conductive Agent)

The conductive agent is used to enhance the current collection performance of the active material-containing layer and to suppress the contact resistance between the active material-containing layer and the current collector. The conductive agent includes at least carbon fiber. The carbon fiber may be fibrous carbon having a ratio L1/S1 of or more between an average fiber length L1 and an average diameter S1 of a cross-sectional surface perpendicular to the longitudinal direction. The ratio L1/S1 is preferably 200 or more and 40000 or less. The average diameter of the carbon fiber is preferably 1 nm or more and 50 nm or less. The average fiber length of the carbon fiber is preferably 1 μm or more and 200 μm or less. The average diameter and the average fiber length of the carbon fiber can be measured by performing electron microscope observation with a SEM, a transmission electron microscope (TEM), or the like.

Examples of the carbon fiber include vapor-grown carbon fiber (VGCF). Examples of the vapor-grown carbon fiber include carbon nanotube (CNT) and carbon nanofiber (CNF). One of them may be used as the carbon fiber, or two or more of them may be used in combination as the carbon fiber.

A monolayer nanotube or a multilayer nanotube formed of monolayer nanotubes layered concentrically on top of each other may be used as the carbon nanotube. In view of the costs, it is preferable to use a multilayer carbon nanotube. Alternatively, a monolayer carbon nanotube and a multilayer carbon nanotube may be used together. In particular, a thin-layer carbon nanotube composed of two to three layers is favorable in terms of both the costs and the performance.

The average diameter of the multilayer carbon nanotube is preferably 3 nm or more and 30 nm or less, and the average fiber length of the multilayer carbon nanotube is preferably 1 μm or more and 20 μm or less. The average diameter of the monolayer carbon nanotube is preferably 1 nm or more and 3 nm or less, and the average fiber length of the monolayer carbon nanotube is preferably 0.2 µm or more and 10 µm or less. The average diameter of the thin-layer carbon nanotube is preferably 6 nm or more and 25 nm or less, and the average fiber length of the thin-layer carbon nanotube is preferably 20 µm or more and 200 µm or less.

The carbon fiber may contain one or more metal elements selected from Fe, Co, Ni, and Zn. The content of one or more metal elements is preferably 0.0001 mass % or more and 5 mass % or less, more preferably 0.0003 mass % or more and 0.5 mass % or less, and still more preferably 0.01 mass % or more and 0.5 mass % or less. When the carbon fiber contains the above metal elements, the effect of adsorption on the active material, granular carbon, and current collector is enhanced. However, if the carbon fiber contains an excessive amount of metal elements, metal ions leach into the electrode, likely causing a negative effect on the battery reaction. The content of the above metal elements in the carbon fiber can be measured by inductively coupled plasma-mass spectrometry (ICP-MS).

The conductive agent may include granular carbon such as carbon black. The granular carbon has a ratio L2/S2 of lower than 50 between a length L2 of its long axis and a length S2 of its short axis. Examples of the carbon black include acetylene black and Ketjenblack. For use in a battery, acetylene black is most preferred. As the granular carbon, graphite, activated carbon, coke, or the like may be adopted. Graphite is plate-shaped and slippery, and therefore can increase the electrode density without causing the orientation of the active material particles to be arranged to certain directions. Also, a metal powder, a metal compound powder, or a mixture thereof may be used as the conductive agent.

The content of the conductive agent in the active material-containing layer is preferably 2 mass % or more and 10 mass % or less. The content of the carbon fiber in the active material-containing layer is preferably 0.05 mass % or more and 5 mass % or less. In the active material-containing layer, the amount of conductive agent with respect to 100 parts by mass of the active material is preferably 2 parts by mass or more and 12 parts by mass or less. The content of the carbon fiber in the active material-containing layer is preferably 0.05 parts by mass or more and 6 parts by mass or less.

(Cellulose Fiber)

Examples of the cellulose fiber include cellulose nanofiber. Cellulose nanofiber is mainly obtained by micro-refining and dispersing the native cellulose fiber such as wood fiber (pulp) in water. As described above, cellulose nanofiber functions as a dispersant of the carbon fiber. Further, cellulose nanofiber has sufficient viscosity and adhesiveness, and may function as a binder.

The average diameter of the cellulose nanofiber is, for example, 1 nm or more and 80 nm or less. The average fiber length of the cellulose nanofiber is, for example, 100 nm or more and 10 µm or less. When the cellulose nanofiber is short, the dispersiveness of the carbon fiber tends to increase. When the cellulose nanofiber is long, the effects as a binder tend to increase. The average diameter and the average fiber length of the cellulose nanofiber can be measured by performing electron microscope observation with a TEM or the like.

As a method for micro-refining the cellulose nanofiber, any one of a mechanical treatment adopting a high-pressure homogenizer, an aqueous counter collision method that utilizes collision of opposing high-pressure water currents, or the like, or a chemical treatment may be adopted.

Cellulose nanofiber obtained by performing the TEMPO (2,2,6,6-tetramethylpiperidine-1-oxyradical) catalytic oxidation method as a chemical micro-refining treatment is preferably used. According to this method, a carboxyl group can be introduced into the surface of cellulose microfibril at a high density. Therefore, the cellulose nanofiber can be further micro-refined. Since the TEMPO-oxidized cellulose nanofiber has a carboxyl group, the TEMPO-oxidized cellulose nanofiber is easily adsorbed on the conductive agent or the active material, and is even more excellent in improving the dispersiveness of the conductive agent. Since the carbon fiber on which the TEMPO-oxidized cellulose nanofiber is adsorbed can form cross-links between the active materials, the conductive path solidifies even more. Further, since the TEMPO-oxidized cellulose nanofiber can be adsorbed on the current collector as well, the adhesion of the active material-containing layer to the current collector can be further enhanced.

The average diameter of the TEMPO-oxidized cellulose nanofiber is preferably 3 nm or more and 4 nm or less, and the average fiber length of the TEMPO-oxidized cellulose nanofiber is preferably 100 nm or more and 1 µm or less.

Cellulose nanofiber obtained through a mechanical treatment and TEMPO-oxidized cellulose nanofiber may be used together for the cellulose nanofiber.

The content of the cellulose nanofiber in the active material-containing layer is preferably 0.3 mass % or more and 2 mass % or less. If the amount of cellulose nanofiber is too small, the dispersiveness of the carbon fiber tends to decrease. If the amount of cellulose nanofiber is too large, internal resistance of the electrode is increased, and the hardness is excessively increased, likely causing a decrease of the production efficiency. In the active material-containing layer, the amount of cellulose nanofiber with respect to 100 parts by mass of the active material is preferably 0.3 parts by mass or more and 2.3 parts by mass or less. A mass ratio between the cellulose nanofiber and the carbon fiber is preferably 0.05 to 50:1.

(Binder)

The binder is used for binding the active material and the conductive agent. In a case where an aqueous solvent is used as a solvent of a slurry for electrode formation, at least one selected from the group consisting of styrene-butadiene rubber, styrene-acrylate resins, acrylic resins, urethane resins, polytetrafluoroethylene (PTFE), fluororubber, polyimide resin, core-shell binder, and carboxymethyl cellulose (CMC) may be adopted as the binder. In a case where an organic solvent is used, at least one selected from the group consisting of polyvinylidene fluoride (PVDF), acrylic resins, polyimide resins, and acrylonitrile resins may be adopted as the binder.

The binder preferably includes carboxymethyl cellulose. When CMC is contained, the viscosity of an electrode slurry can be easily adjusted; thus, not only does the coatability improve, but improved adhesiveness and suppression of a side reaction that occurs during charge and discharge of a battery by coating the active material with CMC, for example, can also be expected. Improved dispersiveness of the cellulose nanofiber can also be expected. CMC having a degree of etherification of 1.0 or more is preferably employed. If CMC has a high degree of etherification, improved coatability due to reduced thixotropy, improved electrode flexibility, improved ease of pressing of electrode, and the like can be expected.

The content of the binder in the active material-containing layer is preferably 0.7 mass % or more and 4 mass % or less. The binder may be omitted. The amount of binder with respect to 100 parts by mass of the active material is preferably 0.7 parts by mass or more and 4.7 parts by mass or less.

(Method for Manufacturing Electrode)

The electrode can be manufactured by applying an electrode slurry on one or both surfaces of the current collector to form a coating film, drying the coating film, and then performing a pressing process. To prepare the electrode slurry, a suspension of cellulose fiber dispersed in water is first prepared. The suspension may be liquid, gelatinous, or solid. Carbon fiber is mixed into the suspension and stirred, and then a conductive agent other than carbon fiber is optionally added and stirred, to prepare a conductive agent paste. An aqueous carboxymethyl cellulose solution is optionally mixed into the conductive agent paste, and then an active material is further added thereto and stirred, to prepare an active material paste. An aqueous binder solution is optionally mixed into the active material paste, and stirred using a bead mill or the like, to produce the electrode slurry.

As explained above, a suspension of the cellulose fiber is mixed with the carbon fiber first, thereby causing an interaction between the cellulose fiber and the carbon fiber, and allowing the dispersiveness of the carbon fiber in the active material-containing layer to be enhanced.

The method for the dispersion process is not particularly limited; however, in the usual case, a high-speed mixer such as a lab disperser, a homomixer, a planetary mixer, a powder absorbing, dissolving and dispersion device (JET paster), a high-speed mixer (FILMIX; registered trademark), a planetary centrifugal mixer, or the like may be used. Bead mill dispersion may also be performed, as necessary. It is important that the dispersion process be not overly performed so that an agglomerate of carbon fiber is formed to a certain extent on the interface of the current collector and does not float on the electrode surface. When performing the dispersion process, a JET paster, a FILMIX mixer, or a planetary centrifugal mixer is preferably used.

The method of applying the electrode slurry to the current collector is not particularly limited. For example, a die coater, a gravure coater, a silk-screen coater, a comma coater, a blade coater, or the like may be adopted. The method of drying the electrode slurry applied to the current collector is not particularly limited, and hot-air drying, far-infrared drying, microwave drying, or the like may be adopted.

The electrode according to the first embodiment described above includes an active material-containing layer that contains an active material, a conductive agent including carbon fiber, and cellulose fiber. In the electrode, the number of first agglomerates on the second surface, which is an opposite surface of the first surface brought into contact with the current collector, is 2000/mm$^2$ or less. The first agglomerate includes at least one of the carbon fiber or the cellulose fiber, does not include the active material, and has a longest diameter of 5 µm or more and a shortest diameter of 1 µm or more. The electrode configured as described above is excellent in terms of the dispersiveness of the conductive agent including the carbon fiber in the active material-containing layer. Therefore, a secondary battery using this electrode can exhibit excellent cycle performance.

Second Embodiment

According to a second embodiment, a secondary battery including a negative electrode, a positive electrode, and an electrolyte is provided. At least one of the negative electrode or the positive electrode is the electrode according to the first embodiment. When one of the negative electrode or the positive electrode is the electrode according to the first embodiment, the counter electrode may have a configuration different from that of the first embodiment.

The secondary battery according to the second embodiment may further include a separator disposed between the positive electrode and the negative electrode. The negative electrode, the positive electrode, and the separator can constitute an electrode group. The electrolyte can be retained in the electrode group.

The secondary battery according to the second embodiment may further include a container member for storing the electrode group and the electrolyte.

The secondary battery according to the second embodiment may also include a negative electrode terminal electrically connected to the negative electrode, and a positive electrode terminal electrically connected to the positive electrode.

The secondary battery according to the second embodiment may be, for example, a lithium ion secondary battery. The secondary battery includes a nonaqueous electrolyte secondary battery that includes a nonaqueous electrolyte.

Hereinafter, the counter electrode, the electrolyte, the separator, the container member, the negative electrode terminal, and the positive electrode terminal will be described in detail.

1) Counter Electrode

The counter electrode may include an active material-containing layer and a current collector. The active material-containing layer may be supported on one or both surfaces of the current collector. The active material-containing layer may contain an active material, a conductive agent, and a binder. The active material-containing layer may or may not contain inorganic solid particles and carbon fiber. The counter electrode is a negative electrode when the electrode according to the embodiment is a positive electrode, and is a positive electrode when the electrode according to the embodiment is a negative electrode. The counter electrode is preferably a positive electrode.

The negative electrode active material or the positive electrode active material described above can be adopted as the active material of the counter electrode.

Examples of the binder of the counter electrode include polytetrafluoro ethylene (PTFE), polyvinylidene fluoride (PVdF), fluororubber, a polyacrylic acid compound, an imide compound, carboxymethyl cellulose (CMC) and salts of CMC. One of these may be used as the binder, or two or more of these may be used in combination as the binder.

Examples of the conductive agent of the counter electrode include carbonaceous substances such as vapor-grown carbon fiber (VGCF), carbon black such as acetylene black, and graphite. One of these may be used as the conductive agent, or two or more of these may be used in combination as the conductive agent. The conductive agent may be omitted.

2) Electrolyte

As the electrolyte, a liquid nonaqueous electrolyte or a gel nonaqueous electrolyte, for example, may be used. The liquid nonaqueous electrolyte is prepared by dissolving an electrolyte salt as a solute in an organic solvent. The concentration of the electrolyte salt is preferably 0.5 mol/L or more and 2.5 mol/L or less.

Examples of the electrolyte salt include lithium salts such as lithium perchlorate ($LiClO_4$), lithium hexafluorophosphate ($LiPF_6$), lithium tetrafluoroborate ($LiBF_4$), hexafluoro arsenic lithium ($LiAsF_6$), lithium trifluoromethanesulfonate ($LiCF_3SO_3$), bistrifluoromethylsulfonylimide lithium (LiN ($CF_3SO_2)_2$), and mixtures thereof. The electrolyte salt is preferably less likely to be oxidized even at high potentials, and $LiPF_6$ is most preferred.

Examples of the organic solvent include: cyclic carbonates such as propylene carbonate (PC), ethylene carbonate (EC), and vinylene carbonate (VC); chain carbonates such as diethyl carbonate (DEC), dimethyl carbonate (DMC), and methyl ethyl carbonate (MEC); cyclic ethers such as tetrahydrofuran (THF), 2-methyl tetrahydrofuran (2-MeTHF), and dioxolane (DOX); chain ethers such as dimethoxy ethane (DME) and diethoxy ethane (DEE); γ-butyrolactone (GBL); acetonitrile (AN); and sulfolane (SL). These organic solvents may be used singularly or as a mixed solvent.

The gel nonaqueous electrolyte is prepared by obtaining a composite of a liquid nonaqueous electrolyte and a polymeric material. Examples of the polymeric material include polyvinylidene fluoride (PVdF), polyacrylonitrile (PAN), polyethylene oxide (PEO), and mixtures thereof.

Alternatively, the nonaqueous electrolyte may be, for example, a room temperature molten salt (ionic melt) containing lithium ions, a polymer solid electrolyte, or an inorganic solid electrolyte, other than the liquid nonaqueous electrolyte or the gel nonaqueous electrolyte.

The room temperature molten salt (ionic melt) refers to compounds which may exist in a liquid state at room temperature (15° C. to 25° C.) among organic salts formed of combinations of organic cations and anions. The room temperature molten salt includes those that singly exist in a liquid state, those that are put into a liquid state when mixed with an electrolyte salt, those that are put into a liquid state when dissolved in an organic solvent, and mixtures thereof. Generally, the melting point of the room temperature molten salt used in a secondary battery is 25° C. or less. Further, the organic cation generally has a quaternary ammonium skeleton.

The polymer solid electrolyte is prepared by dissolving the electrolyte salt in the polymeric material and solidifying it.

3) Separator

The separator is made of, for example, a porous film or synthetic resin nonwoven fabric including at least one selected from the group consisting of polyethylene (PE), polypropylene (PP), cellulose, and polyvinylidene fluoride (PVdF). From a safety standpoint, a porous film made of polyethylene or polypropylene is preferred, as such a porous film melts at a fixed temperature and is thus able to shut off current.

4) Container Member

As the container member, for example, a container made of laminate film or metal may be used.

The thickness of the laminate film is, for example, 0.5 mm or less, and preferably 0.2 mm or less.

As the laminate film, a multilayer film including multiple resin layers and a metal layer interposed between the resin layers is used. The resin layer includes, for example, a polymeric material such as polypropylene (PP), polyethylene (PE), nylon, or polyethylene terephthalate (PET). The metal layer is preferably made of an aluminum foil or an aluminum alloy foil, so as to reduce weight. The laminate film may be formed into a shape of a container member by heat-sealing.

The wall thickness of the metal container is, for example, 1 mm or less, more preferably 0.5 mm or less, and still more preferably 0.2 mm or less.

The metal container is made, for example, of aluminum or an aluminum alloy. The aluminum alloy preferably contains an element such as magnesium, zinc, or silicon. If the aluminum alloy contains a transition metal such as iron, copper, nickel, or chromium, the content thereof is preferably 100 ppm by mass or less.

The shape of the container member is not particularly limited. The shape of the container member may be, for example, flat (thin), square, cylindrical, coin-shaped, or button-shaped. The container member can be suitably selected depending on the size of the battery or the intended use of the battery.

5) Negative Electrode Terminal

The negative electrode terminal may be made of a material that is electrochemically stable at the potential at which Li is inserted into and extracted from the above-described negative electrode active material, and has electrical conductivity. Specific examples of the material for the negative electrode terminal include copper, nickel, stainless steel, aluminum, and an aluminum alloy containing at least one element selected from the group consisting of Mg, Ti, Zn, Mn, Fe, Cu, and Si. Aluminum or an aluminum alloy is preferred as the material for the negative electrode terminal. The negative electrode terminal is preferably made of the same material as that of the negative electrode current collector, in order to reduce the contact resistance with the negative electrode current collector.

6) Positive Electrode Terminal

The positive electrode terminal may be made of a material that is electrically stable in the potential range of 3 V to 4.5 V (vs. Li/Li$^+$) relative to the oxidation-and-reduction potential of lithium and has electrical conductivity. Examples of the material for the positive electrode terminal include aluminum and an aluminum alloy containing at least one element selected from the group consisting of Mg, Ti, Zn, Mn, Fe, Cu, and Si. The positive electrode terminal is preferably made of the same material as that of the positive electrode current collector, in order to reduce the contact resistance with the positive electrode current collector.

Next, the secondary battery according to the second embodiment will be more specifically described with reference to the drawings.

Figure 3:
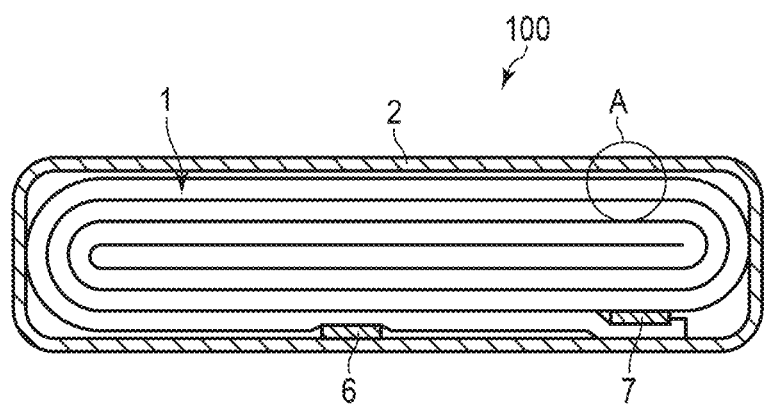
FIG. 3 is a cross-sectional view schematically showing an example of a secondary battery according to the embodiment.
Figure 4:
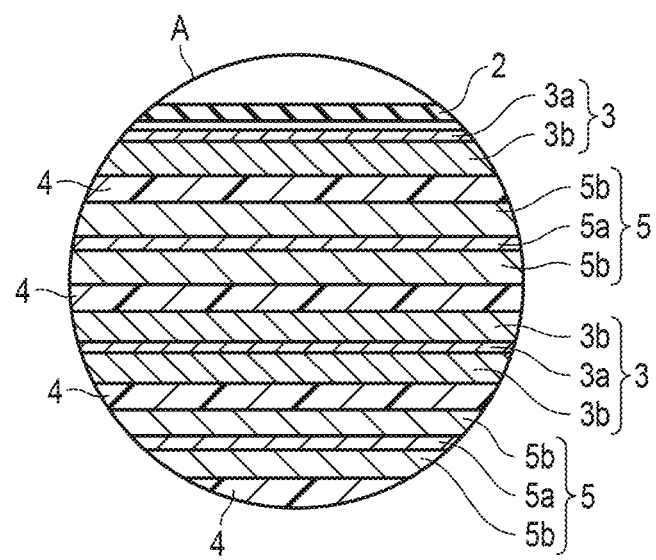
FIG. 4 is an enlarged cross-sectional view of section A of the secondary battery shown in FIG. 3.

FIG. 3 is a cross-sectional view schematically showing an example of a secondary battery according to the embodiment. FIG. 4 is an enlarged cross-sectional view of section A of the secondary battery shown in FIG. 3.

The secondary battery 100 shown in FIGS. 3 and 4 includes a bag-shaped container member 2 shown in FIG. 3, an electrode group 1 shown in FIGS. 3 and 4, and an electrolyte, which is not shown. The electrode group 1 and the electrolyte are housed in the bag-shaped container member 2. The electrolyte (not shown) is held in the electrode group 1.

As shown in FIG. 3, the electrode group 1 is a wound electrode group in a flat form. The wound electrode group 1 in a flat form includes a negative electrode 3, a separator 4, and a positive electrode 5, as shown in FIG. 4. The separator 4 is sandwiched between the negative electrode 3 and the positive electrode 5.

The negative electrode 3 includes a negative electrode current collector 3a and a negative electrode active material-containing layer 3b. The active material is included in the negative electrode active material-containing layer 3b. At the portion of the negative electrode 3 positioned outermost among the wound electrode group 1, the negative electrode active material-containing layer 3b is formed only on an inner surface of the negative electrode current collector 3a, as shown in FIG. 4. For the other portions of the negative electrode 3, negative electrode active material-containing layers 3b are formed on both of reverse surfaces of the negative electrode current collector 3a.

The positive electrode 5 includes a positive electrode current collector 5a and positive electrode active material-containing layers 5b formed on both of reverse surfaces of the positive electrode current collector 5a.

As shown in FIG. 3, a negative electrode terminal 6 and positive electrode terminal 7 are positioned in vicinity of the outer peripheral edge of the wound electrode group 1. The negative electrode terminal 6 is connected to a portion of the negative electrode current collector 3a of the negative electrode 3 positioned outermost. The positive electrode terminal 7 is connected to the positive electrode current collector 5a of the positive electrode 5 positioned outermost. The negative electrode terminal 6 and the positive electrode terminal 7 extend out from an opening of the bag-shaped container member 2. The bag-shaped container member 2 is heat-sealed by a thermoplastic resin layer arranged on the interior thereof.

Figure 5:
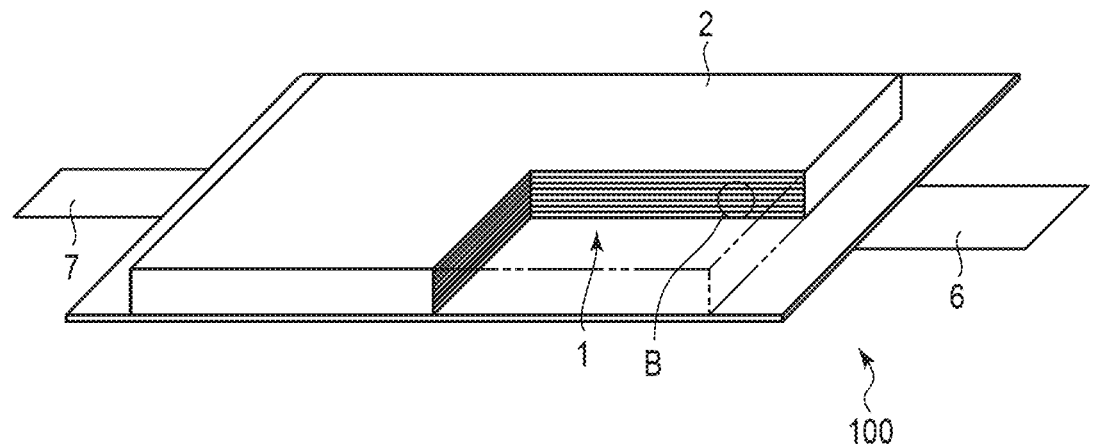
FIG. 5 is a partially cut-out perspective view schematically showing another example of a secondary battery according to the embodiment.
Figure 6:
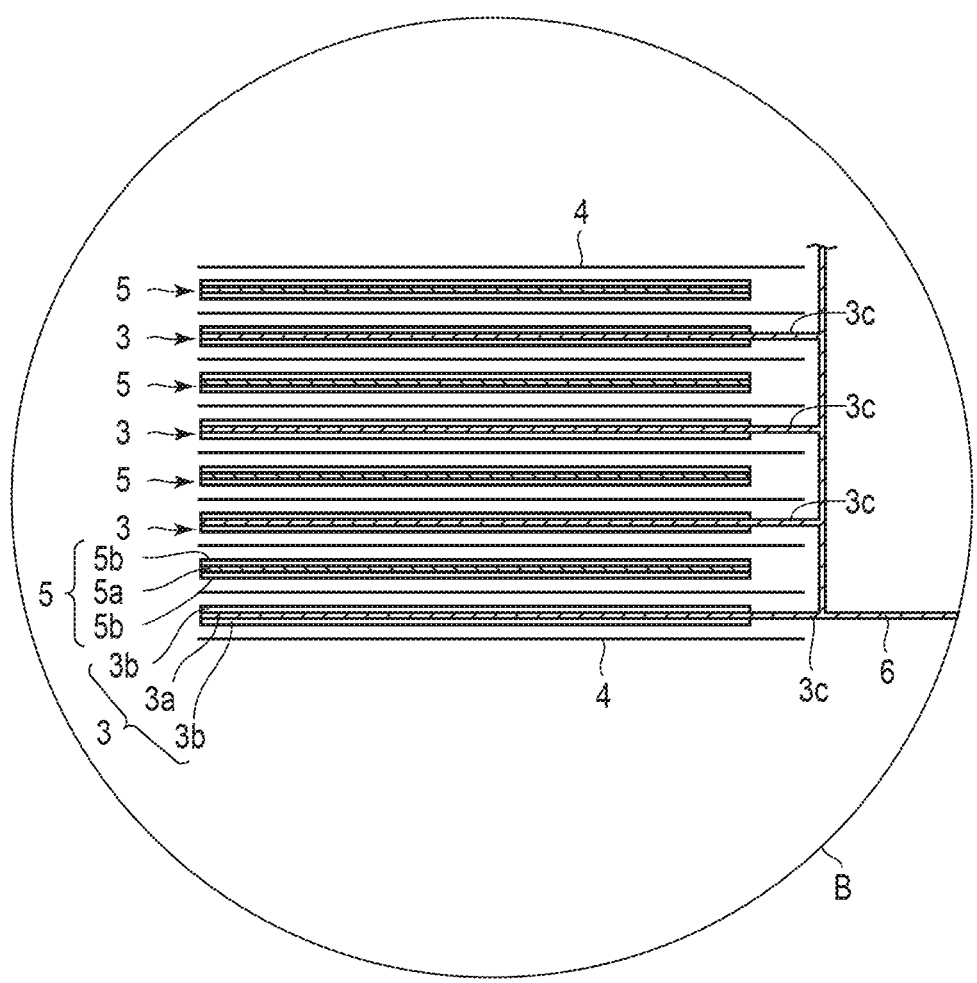
FIG. 6 is an enlarged cross-sectional view of section B of the secondary battery shown in FIG. 5.

The secondary battery according to the second embodiment is not limited to the secondary battery of the structure shown in FIGS. 3 and 4, and may be, for example, a battery of a structure as shown in FIGS. 5 and 6.

FIG. 5 is a partially cut-out perspective view schematically showing another example of a secondary battery according to the embodiment. FIG. 6 is an enlarged cross-sectional view of section B of the secondary battery shown in FIG. 5.

The secondary battery 100 shown in FIGS. 5 and 6 includes an electrode group 1 shown in FIGS. 5 and 6, a container member 2 shown in FIG. 5, and an electrolyte, which is not shown. The electrode group 1 and the electrolyte are housed in the container member 2. The electrolyte is held in the electrode group 1.

The container member 2 is made of a laminate film including two resin layers and a metal layer sandwiched between the resin layers.

As shown in FIG. 6, the electrode group 1 is a stacked electrode group. The stacked electrode group 1 has a structure in which positive electrodes 3 and negative electrodes 5 are alternately stacked with separator(s) 4 sandwiched therebetween.

The electrode group 1 includes a plurality of the negative electrodes 3. Each of the negative electrodes 3 includes the negative electrode current collector 3a and the negative electrode active material-containing layers 3b supported on both surfaces of the negative electrode current collector 3a. The electrode group 1 further includes a plurality of the positive electrodes 5. Each of the positive electrodes 5 includes the positive electrode current collector 5a and the positive electrode active material-containing layers 5b supported on both surfaces of the positive electrode current collector 5a.

The negative electrode current collector 3a of each of the negative electrodes 3 includes at its side a portion 3c where the negative electrode active material-containing layer 3b is not supported on any surface. This portion 3c serves as a negative electrode tab. As shown in FIG. 6, the portion 3c serving as the negative electrode tab does not overlap the positive electrode 5. A plurality of the negative electrode tabs (portions 3c) are electrically connected to the belt-like negative electrode terminal 6. A leading end of the belt-like negative electrode terminal 6 is drawn to the outside from a container member 2.

Although not shown, the positive electrode current collector 5a of each of the positive electrodes 5 includes at its side a portion where the positive electrode active material-containing layer 5b is not supported on any surface. This portion serves as a positive electrode tab. Like the negative electrode tab (portion 3c), the positive electrode tab does not overlap the negative electrode 3. Further, the positive electrode tab is located on the opposite side of the electrode group 1 with respect to the negative electrode tab (portion 3c). The positive electrode tab is electrically connected to the belt-like positive electrode terminal 7. A leading end of the belt-like positive electrode terminal 7 is located on the opposite side of the negative electrode terminal 6 and drawn to the outside from the container member 2.

The secondary battery according to the second embodiment includes the electrode according to the first embodiment. Therefore, the secondary battery according to the second embodiment exhibits excellent cycle performance.

Third Embodiment

According to a third embodiment, a battery module is provided. The battery module according to the third embodiment includes plural secondary batteries according to the second embodiment.

In the battery module according to the third embodiment, each of the single batteries may be arranged electrically connected in series, in parallel, or in a combination of in-series connection and in-parallel connection.

An example of the battery module according to the third embodiment will be described next with reference to the drawings.

Figure 7:
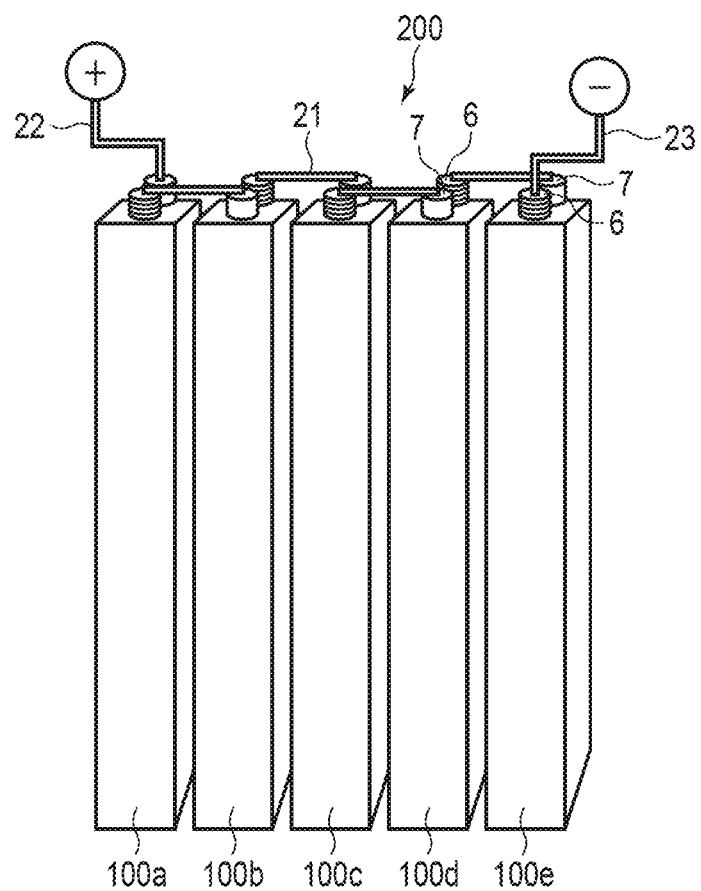
FIG. 7 is a perspective view schematically showing an example of a battery module according to the embodiment.

FIG. 7 is a perspective view schematically showing an example of the battery module according to the embodiment. A battery module 200 shown in FIG. 7 includes five single-batteries 100a to 100e, four bus bars 21, a positive electrode-side lead 22, and a negative electrode-side lead 23. Each of the five single-batteries 100a to 100e is a secondary battery according to the second embodiment.

For example, a bus bar 21 connects a negative electrode terminal 6 of one single-battery 100a and a positive electrode terminal 7 of the single-battery 100b positioned adjacent. The five single-batteries 100 are thus connected in series by the four bus bars 21. That is, the battery module 200 shown in FIG. 7 is a battery module of five in-series connection. In the battery module including a plurality of the single-batteries which are electrically connected in parallel, the plurality of the single-batteries can be electrically connected to each other, by, for example, connecting a plurality of the negative electrode terminals to each other via a bus bar and connecting a plurality of the positive electrode terminals to each other via a bus bar, which is not illustrated though.

A positive electrode terminal 7 of at least one cell among five single-batteries 100a to 100e is electrically connected to a positive electrode lead 22 for external connection. Further, a negative electrode terminal 6 of at least one cell among the five single-batteries 100a to 100e is electrically connected to a negative electrode lead 23 for external connection.

The battery module according to the third embodiment includes the secondary battery according to the second embodiment. Therefore, the battery module according to the third embodiment exhibits excellent cycle performance.

Fourth Embodiment

According to a fourth embodiment, a battery pack is provided. The battery pack includes a battery module according to the third embodiment. The battery pack may include a single secondary battery according to the second embodiment, in place of the battery module according to the third embodiment.

The battery pack according to the fourth embodiment may further include a protective circuit. The protective circuit has a function to control charging and discharging of the secondary battery. Alternatively, a circuit included in equipment where the battery pack serves as a power source (for example, electronic devices, vehicles, and the like) may be used as the protective circuit for the battery pack.

Moreover, the battery pack according to the fourth embodiment may further include an external power distribution terminal. The external power distribution terminal is configured to externally output current from the secondary battery, and to input external current into the secondary battery. In other words, when the battery pack is used as a power source, the current is provided out via the external power distribution terminal. When the battery pack is charged, the charging current (including regenerative energy of motive force of vehicles such as automobiles) is provided to the battery pack via the external power distribution terminal.

Next, an example of a battery pack according to the fourth embodiment will be described with reference to the drawings.

Figure 8:
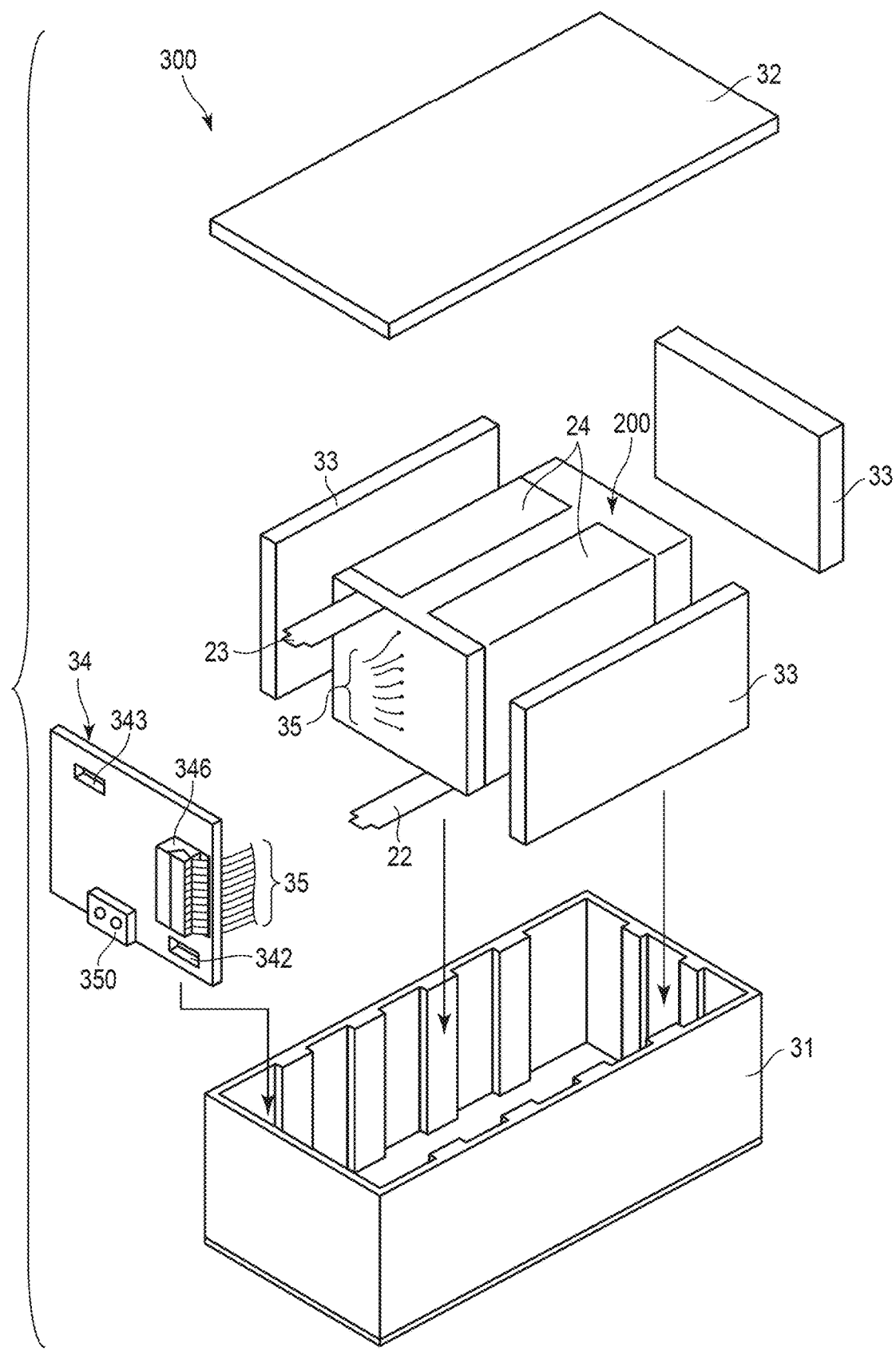
FIG. 8 is an exploded perspective view schematically showing an example of a battery pack according to the embodiment.
Figure 9:
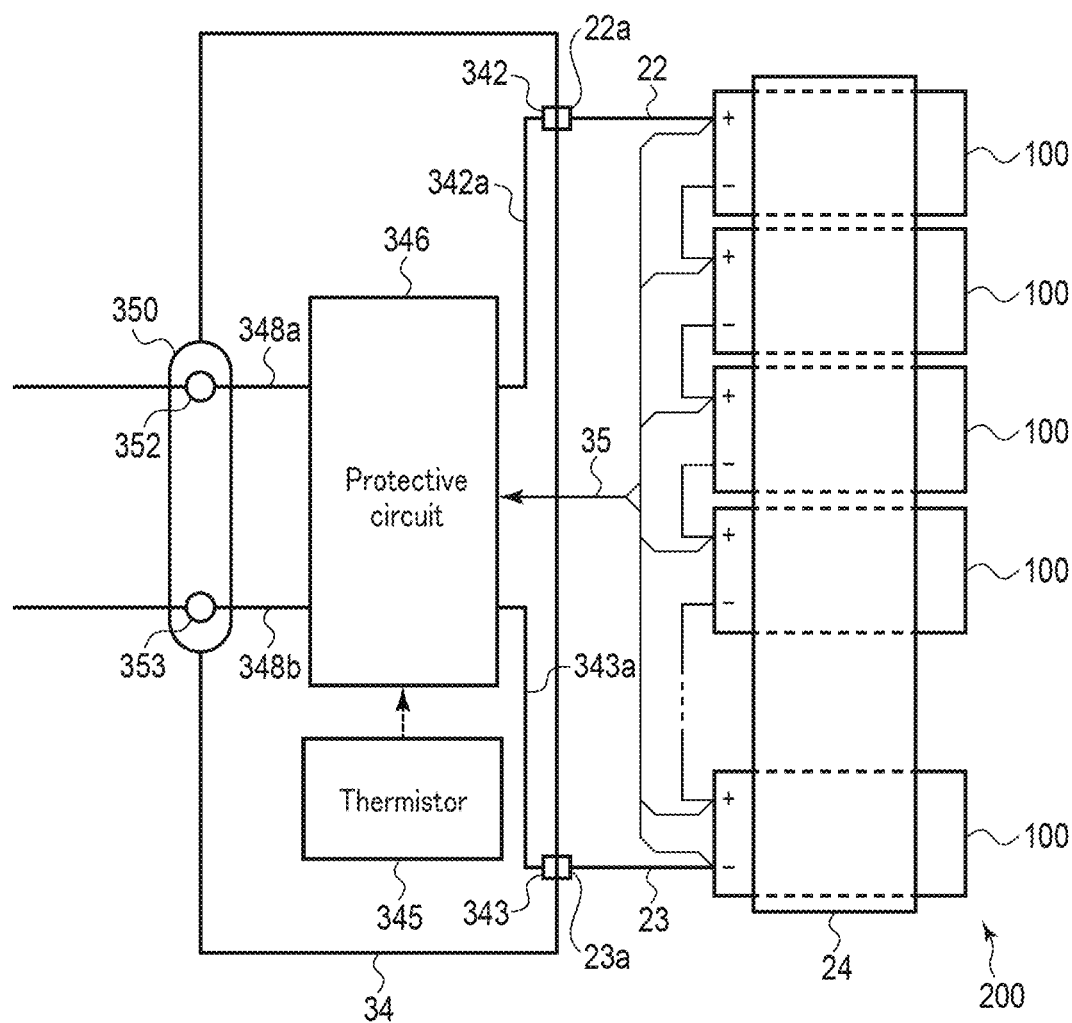
FIG. 9 is a block diagram showing an example of an electric circuit of the battery pack shown in FIG. 8.

FIG. 8 is an exploded perspective view schematically showing an example of the battery pack according to the embodiment. FIG. 9 is a block diagram showing an example of an electric circuit of the battery pack shown in FIG. 8.

A battery pack 300 shown in FIGS. 8 and 9 includes a housing container 31, a lid 32, protective sheets 33, a battery module 200, a printed wiring board 34, wires 35, and an insulating plate (not shown).

The housing container 31 shown in FIG. 8 is a square bottomed container having a rectangular bottom surface. The housing container 31 is configured to be capable of storing the protective sheets 33, the battery module 200, the printed wiring board 34, and the wires 35. The lid 32 has a rectangular shape. The lid 32 covers the housing container 31 to store the battery module 200 and so on. The housing container 31 and the lid 32 are provided with openings, connection terminals, or the like (not shown) for connection to an external device or the like.

The battery module 200 includes plural single-batteries 100, a positive electrode-side lead 22, a negative electrode-side lead 23, and an adhesive tape 24.

At least one of the plural single-batteries 100 is a secondary battery according to the second embodiment. The plural single-batteries 100 are electrically connected in series, as shown in FIG. 9. The plural single-batteries 100 may alternatively be electrically connected in parallel, or connected in a combination of in-series connection and in-parallel connection. If the plural single-batteries 100 are connected in parallel, the battery capacity increases as compared to a case in which they are connected in series.

The adhesive tape 24 fastens the plural single-batteries 100. The plural single-batteries 100 may be fixed using a heat-shrinkable tape in place of the adhesive tape 24. In this case, the protective sheets 33 are arranged on both side surfaces of the battery module 200, and the heat-shrinkable tape is wound around the battery module 200 and protective sheets 33. After that, the heat-shrinkable tape is shrunk by heating to bundle the plural single-batteries 100.

An end of the positive electrode-side lead 22 is connected to the battery module 200. The end of the positive electrode-side lead 22 is electrically connected to a positive electrode of one or more of the single-batteries 100. An end of the negative electrode-side lead 23 is connected to the battery module 200. The end of the negative electrode-side lead 23 is electrically connected to a negative electrode of one or more of the single-batteries 100.

A printed wiring board 34 is disposed on the one inner surface along the short-side direction of inner surfaces of the housing container 31. The printed wiring board 34 includes a positive electrode-side connector 342, a negative electrode-side connector 343, a thermistor 345, a protective circuit 346, wirings 342a and 343a, an external power distribution terminal 350, a plus-side (positive-side) wire 348a, and a minus-side (negative-side) wire 348b. One main surface of the printed wiring board 34 faces one side surface of the battery module 200. An insulating plate (not shown) is disposed in between the printed wiring board 34 and the battery module 200.

To the positive electrode-side connector 342, other end 22a of the positive electrode-side lead 22 is electrically connected. To the negative electrode-side connector 343, other end 23a of the negative electrode-side lead 23 is electrically connected.

The thermistor 345 is fixed to one main surface of the printed wiring board 34. The thermistor 345 detects the temperature of each single-battery 100 and transmits detection signals to the protective circuit 346.

The external power distribution terminal 350 is fixed to the other main surface of the printed wiring board 34. The external power distribution terminal 350 is electrically connected to device(s) that exists outside the battery pack 300. The external power distribution terminal 350 includes positive-side terminal 352 and negative-side terminal 353.

The protective circuit 346 is fixed to the other main surface of the printed wiring board 34. The protective circuit 346 is connected to the positive-side terminal 352 via the plus-side wire 348a. The protective circuit 346 is connected to the negative-side terminal 353 via the minus-side wire 348b. In addition, the protective circuit 346 is electrically connected to the positive electrode-side connector 342 via the wiring 342a. The protective circuit 346 is electrically connected to the negative electrode-side connector 343 via the wiring 343a. Furthermore, the protective circuit 346 is electrically connected to each of the plural single-batteries 100 via the wires 35.

The protective sheets 33 are arranged on both inner surfaces of the housing container 31 along the long side direction and on the inner surface along the short side direction, facing the printed wiring board 34 across the battery module 200 positioned therebetween. The protective sheets 33 are made of, for example, resin or rubber.

The protective circuit 346 controls charge and discharge of the plural single-batteries 100. The protective circuit 346 is also configured to cut-off electric connection between the protective circuit 346 and the external power distribution terminal 350 (positive-side terminal 352, negative-side terminal 353) to external devices, based on detection signals transmitted from the thermistor 345 or detection signals transmitted from each single-battery 100 or the battery module 200.

An example of the detection signal transmitted from the thermistor 345 is a signal indicating that the temperature of the single-battery (single-batteries) 100 is detected to be a predetermined temperature or more. An example of the detection signal transmitted from each single-battery 100 or the battery module 200 is a signal indicating detection of over charge, over discharge, and overcurrent of the single-battery (single-batteries) 100. When detecting over charge or the like for each of the single batteries 100, the battery voltage may be detected, or a positive electrode potential or negative electrode potential may be detected. In the latter case, a lithium electrode to be used as a reference electrode may be inserted into each single battery 100.

Note that, as the protective circuit 346, a circuit included in a device (for example, an electronic device or an automobile) that uses the battery pack 300 as a power source may be used.

As described above, the battery pack 300 includes the external power distribution terminal 350. Hence, the battery pack 300 can output current from the battery module 200 to an external device and input current from an external device to the battery module 200 via the external power distribution terminal 350. In other words, when using the battery pack 300 as a power source, the current from the battery module 200 is supplied to an external device via the external power distribution terminal 350. When charging the battery pack 300, a charge current from an external device is supplied to the battery pack 300 via the external power distribution terminal 350. If the battery pack 300 is used as an onboard battery, the regenerative energy of the motive force of a vehicle can be used as the charge current from the external device.

Note that the battery pack 300 may include plural battery modules 200. In this case, the plural battery modules 200 may be connected in series, in parallel, or connected in a combination of in-series connection and in-parallel connection. The printed wiring board 34 and the wires 35 may be omitted. In this case, the positive electrode-side lead 22 and the negative electrode-side lead 23 may be used respectively as a positive-side terminal and a negative-side terminal of the external power distribution terminal.

Such a battery pack is used, for example, in applications where excellent cycle performance is demanded when a large current is extracted. More specifically, the battery pack is used as, for example, a power source for electronic devices, a stationary battery, or an onboard battery for vehicles. An example of the electronic device is a digital camera. The battery pack 300 particularly favorably used as an onboard battery.

The battery pack according to the fourth embodiment includes the secondary battery according to the second embodiment or the battery module according to the third embodiment. Therefore, the battery pack according to the fourth embodiment exhibits excellent cycle performance.

Fifth Embodiment

According to a fifth embodiment, a vehicle is provided. The battery pack according to the fourth embodiment is installed on this vehicle.

In the vehicle according to the fifth embodiment, the battery pack is configured, for example, to recover regenerative energy from motive force of the vehicle. The vehicle may include a mechanism for converting kinetic energy of this vehicle into regenerative energy (Regenerator).

Examples of the vehicle according to the fifth embodiment include two- to four-wheeled hybrid electric automobiles, two- to four-wheeled electric automobiles, electric assist bicycles, and railway cars.

In the vehicle according to the fifth embodiment, the installing position of the battery pack is not particularly limited. For example, the battery pack may be installed in the engine compartment of the vehicle, in rear parts of the vehicle, or under seats.

The vehicle according to the fifth embodiment may include a plurality of the battery packs. In this case, batteries included in the respective battery packs may be electrically connected to each other in series, may be electrically connected to each other in parallel, or may be electrically connected to each other by a combination of series connections and parallel connections. For example, in a case where each battery pack includes a battery module, the battery modules may be electrically connected to each other in series, may be electrically connected to each other in parallel, or may be electrically connected to each other by a combination of series connections and parallel connections. Alternatively, in a case where each battery pack includes a single battery, the respective batteries may be electrically connected to each other in series, may be electrically connected in parallel, or may be electrically connected to each other by a combination of series connections and parallel connections.

An example of the vehicle according to the fifth embodiment is explained below, with reference to the drawings.

Figure 10:
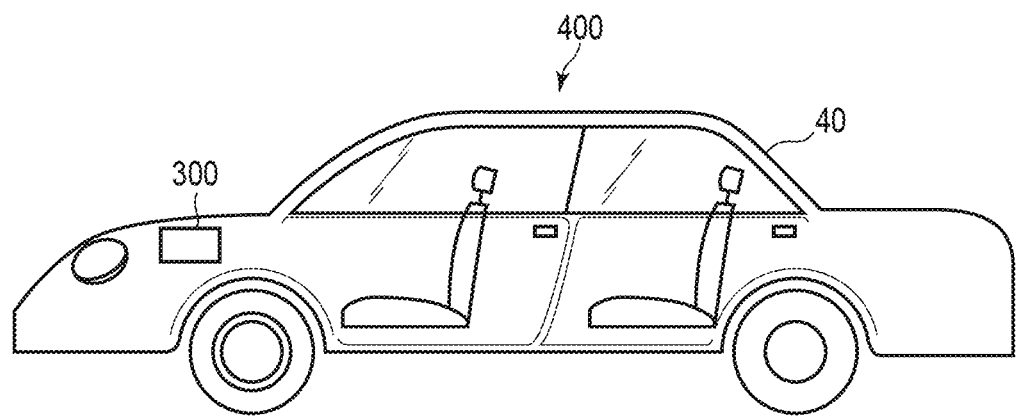
FIG. 10 is a partial perspective view that schematically illustrates an example of a vehicle according to the embodiment.

FIG. 10 is a partial perspective view that schematically illustrates an example of the vehicle according to the embodiment.

A vehicle 400, shown in FIG. 10 includes a vehicle body 40 and a battery pack 300 according to the fourth embodiment. In FIG. 10, the vehicle 400 is a four-wheeled automobile.

This vehicle 400 may have plural battery packs 300 installed. In such a case, the batteries (for example, single battery or battery module) included in the battery packs 300 may be connected in series, connected in parallel, or connected in a combination of in-series connection and in-parallel connection.

An example is shown in FIG. 10, where the battery pack 300 is installed in an engine compartment located at the front of the vehicle body 40. As described above, the battery pack 300 may be installed, for example, in rear sections of the vehicle body 40, or under a seat. The battery pack 300 may be used as a power source of the vehicle 400. The battery pack 300 can also recover regenerative energy of power of the vehicle 400.

Figure 11:
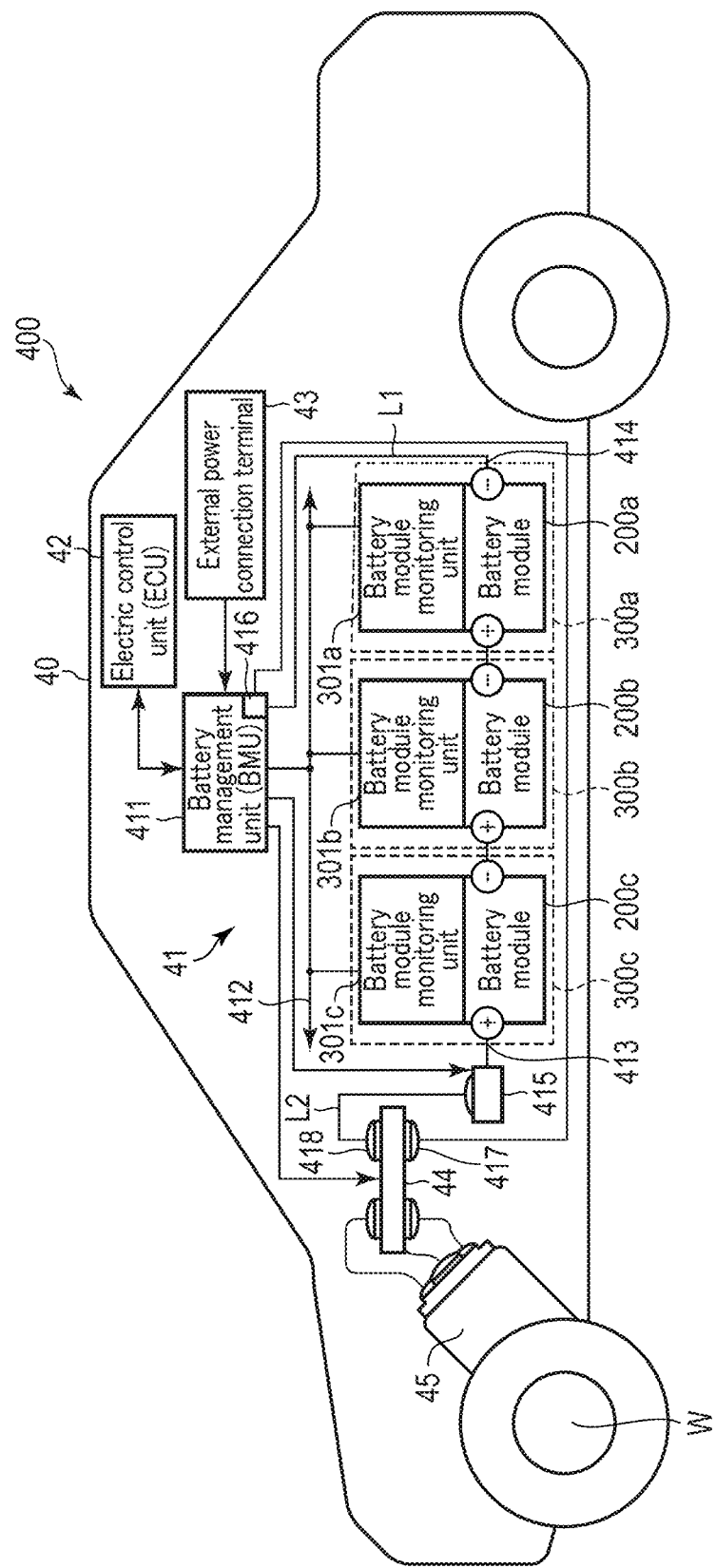
FIG. 11 is a schematic view showing an example of a control system related to an electrical system of the vehicle according to the embodiment.

Next, with reference to FIG. 11, an aspect of operation of the vehicle according to the fifth embodiment is explained.

FIG. 11 is a view that schematically illustrates an example of a control system related to an electric system in the vehicle according to the embodiment. A vehicle 400, shown in FIG. 11, is an electric automobile.

The vehicle 400, shown in FIG. 11, includes a vehicle body 40, a vehicle power source 41, a vehicle ECU (electric control unit) 42, which is a master controller of the vehicle power source 41, an external terminal (an external power connection terminal) 43, an inverter 44, and a drive motor 45.

The vehicle 400 includes the vehicle power source 41, for example, in the engine compartment, in the rear sections of the automobile body, or under a seat. In FIG. 11, the position of the vehicle power source 41 installed in the vehicle 400 is schematically shown.

The vehicle power source 41 includes plural (for example, three) battery packs 300a, 300b and 300c, a battery management unit (BMU) 411, and a communication bus 412.

The battery pack 300a includes a battery module 200a and a battery module monitoring unit (for example, VTM: voltage temperature monitoring) 301a. The battery pack 300b includes a battery module 200b, and a battery module monitoring unit 301b. The battery pack 300c includes a battery module 200c, and a battery module monitoring unit 301c. The battery packs 300a to 300c are battery packs similar to the above-described battery pack 300, and battery modules 200a to 200c are battery modules similar to the above-described battery module 200. The battery modules 200a to 200c are electrically connected in series. The battery packs 300a, 300b and 300c can each be independently removed, and may be exchanged by a different battery pack 300.

Each of the battery modules 200a to 200c includes plural single-batteries connected in series. At least one of the plural single-batteries is the secondary battery according to the second embodiment. The battery modules 200a to 200c each perform charging and discharging via a positive electrode terminal 413 and a negative electrode terminal 414.

The battery management unit 411 communicates with the battery module monitoring units 301a to 301c so as to collect information that is related to voltages, temperatures and the like of the respective single-batteries 100 included in the battery modules 200a to 200c which are included in the vehicle power source 41. Thereby, the battery management unit 411 can collect information that is related to maintenance of the vehicle power source 41.

The battery management unit 411 is connected to the battery module monitoring units 301a to 301c via the communication bus 412. In the communication bus 412, a set of communication lines is shared by plural nodes (with the battery management unit 411 and one or more of the battery module monitoring units 301a to 301c). The communication bus 412 is a communication bus structured according to, for example, a CAN (Control Area Network) standard.

The battery module monitoring units 301a to 301c measure a voltage and a temperature of each single-battery in the battery modules 200a to 200c based on commands from the battery management unit 411. It is possible, however, to measure the temperatures only at several points per battery module, and the temperatures of all of the single-batteries need not be measured.

The vehicle power source 41 can have an electromagnetic contactor (for example, a switch unit 415 shown in FIG. 11) which switches ON and OFF electrical connection between the positive electrode terminal 413 and the negative electrode terminal 414. The switch unit 415 includes: a precharge switch (not illustrated) which is turned on when the battery modules 200a to 200c are charged; and a main switch (not illustrated) which is turned on when battery output from the battery modules 200a to 200c is supplied to a load. Each of the precharge switch and the main switch includes a relay circuit (not illustrated), which is turned ON or OFF by a signal supplied to a coil that is disposed near a switch element. The electromagnetic contactor such as the switch unit 415 is controlled based on a control signal from the battery management unit 411 or a vehicle ECU 42 which controls operations of the entire vehicle 400.

The inverter 44 converts an input direct current voltage into a high voltage of a three-phase alternating current (AC) for driving the motor. A three-phase output terminal of the inverter 44 is connected to each three-phase input terminal of the driving motor 45. The inverter 44 is controlled based on the control signal from the battery management unit 411 or the vehicle ECU 42 for controlling the operations of the entire vehicle. By the control of the inverter 44, the output voltage from the inverter 44 is adjusted.

The driving motor 45 is rotated by electric power supplied from the inverter 44. Driving force generated by the rotation of the driving motor 45 is transmitted via, for example, a differential gear unit to an axle and driving wheels W.

The vehicle 400 also includes a regenerative brake mechanism (regenerator), though not shown. The regenerative brake mechanism rotates the drive motor 45 when the vehicle 400 is braked, and converts kinetic energy into regenerative energy, as electric energy. The regenerative energy, recovered in the regenerative brake mechanism, is inputted into the inverter 44 and converted to direct current. The converted direct current is inputted into the vehicle power source 41.

To the negative electrode terminal 414 of the vehicle power source 41, one of terminals of a connection line L1 is connected. Other terminal of the connection line L1 is connected to a negative electrode input terminal 417 of the inverter 44. The connection line L1 is provided with a current detecting unit (current detecting circuit) 416 in the battery management unit 411 between the negative electrode terminal 414 and the negative electrode input terminal 417.

To the positive electrode terminal 413 of the vehicle power source 41, one of terminals of a connection line L2 is connected. Other terminal of the connection line L2 is connected to a positive electrode input terminal 418 of the inverter 44. The connection line L2 is provided with the switch apparatus 415 between the positive electrode terminal 413 and the positive electrode input terminal 418.

The external terminal 43 is connected to the battery management unit 411. The external terminal 43 is able to connect, for example, to an external power source.

The vehicle ECU 42 controls the vehicle power source 41, the switch unit 415, the inverter 44 and the like cooperatively with other management units and control units including the battery management unit 411, by responding to operation inputs by a driver and the like. By the cooperative control by the vehicle ECU 42 and the like, output of electric power from the vehicle power source 41, charge of the vehicle power source 41 and the like are controlled, whereby the entire vehicle 400 can be managed. Between the battery management unit 411 and the vehicle ECU 42, data related to the maintenance of the vehicle power source 41 such as a remaining capacity of the vehicle power source 41 is transferred via the communication line.

The vehicle according to the fifth embodiment includes the battery pack according to the fourth embodiment. Therefore, the vehicle according to the fifth embodiment excels in terms of traveling distance.

EXAMPLES

Example 1

First, cellulose nanofiber was dispersed in water to prepare a liquid suspension. As the cellulose nanofiber, cellulose nanofiber (CLS1) micro-refined by TEMPO oxidation and having an average fiber length of 0.7 µm and an average fiber diameter of 4 nm was used. Carbon fiber was mixed into the suspension and stirred, and then granular carbon was further added thereto and stirred, to prepare a conductive agent paste. As the carbon fiber, multilayer carbon nanotube (CNT1) having an average fiber length of 15 µm and an average fiber diameter of 7 nm was used. CNT1 included 0.02 mass % of iron and cobalt. As the granular carbon, a mixture of acetylene black having an average particle size of 36 nm and graphite having an average particle size of 6.4 µm was used. A mass ratio between acetylene black and graphite in the mixture was 1:1. An aqueous carboxymethylcellulose solution was mixed into the conductive agent paste, and then an active material was further added thereto and stirred, to prepare an active material paste. Carboxymethylcellulose (CMC1) having a degree of etherification of 1.38 was used. As the active material, niobium-titanium composite oxide ($Nb_2TiO_7$) having an average particle size of 1.0 μm was used. A planetary centrifugal mixer manufactured by THINKY CORPORATION was used to perform the above-described dispersion process. An aqueous binder solution was mixed into the active material paste, and stirred using a bead mill, to produce an electrode slurry. As the binder, styrene-butadiene rubber (SBR) was used.

In the electrode slurry, the amount of each of carbon fiber, granular carbon, cellulose nanofiber, CMC, and SBR with respect to 100 parts by mass of the active material was 2 parts by mass, 4 parts by mass, 1 part by mass, 2 parts by mass, and 2 parts by mass, respectively.

The electrode slurry was applied to one surface of an aluminum foil and dried, and then a rolling process was performed using a roll-pressing machine, to obtain an electrode. The density of the active material-containing layer was 2.6 g/cm$^3$.

Example 2

An electrode was obtained by the same method as in Example 1, except that thin-layer carbon nanotube (CNT2) having an average fiber length of 100 μm and an average fiber diameter of 7 nm was used as the carbon fiber, and the amount of carbon fiber was 1.5 parts by mass. CNT2 included 0.01 mass % of iron and cobalt.

Example 3

An electrode was obtained by the same method as in Example 1, except that monolayer carbon nanotube (CNT3) having an average fiber length of 6 μm and an average fiber diameter of 1.6 nm was used as the carbon fiber, and the amount of carbon fiber was 0.1 parts by mass. CNT3 included 0.5 mass % of iron and cobalt.

Example 4

An electrode was obtained by the same method as in Example 1, except that cellulose nanofiber (CLS2) micro-refined by mechanical cracking and having an average fiber length of 10 μm and an average fiber diameter of 60 nm was used as the cellulose nanofiber.

Example 5

An electrode was obtained by the same method as in Example 1, except that styrene-(meta)acrylic acid ester copolymer (AC) was used instead of styrene-butadiene rubber.

Example 6

An electrode was obtained by the same method as in Example 5, except that cellulose nanofiber (CLS3) micro-refined by TEMPO oxidation and having an average fiber length of 0.8 μm and an average fiber diameter of 4 nm was used as the cellulose nanofiber. A suspension obtained by dispersing this cellulose nanofiber in water was gelatinous.

Example 7

An electrode was obtained by the same method as in Example 1, except that carboxymethylcellulose (CMC2) having a degree of etherification of 0.93 was used.

Example 8

An electrode was obtained by the same method as in Example 1, except that lithium manganese oxide ($LiMn_2O_4$) was used as the active material, and the amount of granular carbon was 5 parts by mass. The density of the active material-containing layer was 3.1 g/cm$^3$.

Example 9

One part by mass of CLS1 as cellulose nanofiber and a powder of multilayer carbon nanotube CNT1 were mixed together and sufficiently dispersed. Then, conductive agents (acetylene black and graphite) similar to those used in Example 1 were mixed together and dispersed. CMC1 in an amount of 1 part by mass and CLS2 in an amount of 1 part by mass were added to the resulting conductive agent paste and mixed together. Then, a powder of niobium-titanium composite oxide similar to that used in Example 1 was added as the active material to the conductive agent paste, and a dispersing process was performed. Thereafter, the same procedure as in Example 1 was performed to obtain an electrode.

Example 10

An electrode was obtained by the same method as in Example 1, except that monolayer carbon nanotube (CNT4) having an average fiber length of 7 μm and an average fiber diameter of 1.6 nm was used as the carbon fiber, and the amount of carbon fiber was 1 part by mass. CNT4 included mass % of iron and cobalt.

Example 11

An electrode was obtained by the same method as in Example 1, except that multilayer carbon nanotube (CNT5) having an average fiber length of 15 μm and an average fiber diameter of 8 nm was used as the carbon fiber. CNT5 included 0.5 mass % of iron and cobalt.

Example 12

An electrode was obtained by the same method as in Example 1, except that the amount of CLS1 was 0.2 parts by mass.

Comparative Example 1

An electrode was obtained by the same method as in Example 1, except that the cellulose nanofiber was not used, and an electrode slurry obtained by the method described below was used to prepare the electrode. First, carbon fiber was mixed into an aqueous carboxymethyl cellulose solution and stirred, and then granular carbon was further added thereto and stirred, to prepare a conductive agent paste. An active material was also added to the conductive agent paste and stirred, to prepare an active material paste. An aqueous binder solution was mixed into the active material paste, and stirred using a bead mill or the like, to produce an electrode slurry.

Comparative Example 2

An electrode was obtained by the same method as in Example 1, except that the carbon fiber was not used.

Comparative Example 3

An electrode was obtained by the same method as in Example 1, except that an electrode slurry obtained by the method described below was used to prepare the electrode. First, a suspension of cellulose nanofiber, carbon fiber, granular carbon, an active material, and an aqueous carboxymethyl cellulose solution were mixed together, and dispersed using a planetary centrifugal mixer manufactured by THINKY CORPORATION, to produce an active material paste. An aqueous binder solution was mixed into the active material paste, and stirred using a bead mill, to produce an electrode slurry.

<Measurement of Number of First and Second Agglomerates>

The number of first agglomerates on the second surface and the number of second agglomerates on the first surface of the electrodes of Examples 1 to 12 and Comparative Examples 1 to 3 were measured by the above-described method. The results of the measurements are shown in Table 2.

The first agglomerates of Examples 1 to 12 and Comparative Example 3 were mixtures containing carbon nanotube, cellulose nanofiber, granular carbon, and a binder, and not containing an active material. The second agglomerates of Examples 1 to 12 and Comparative Example 3 were mixtures containing carbon nanotube, cellulose nanofiber, granular carbon, and a binder, and not containing an active material.

The first agglomerate of Comparative Example 1 was a mixture containing carbon nanotube, granular carbon, and a binder, and not containing an active material. The second agglomerate of Comparative Example 1 was a mixture containing carbon nanotube, granular carbon, and a binder, and not containing an active material.

The first agglomerate of Comparative Example 2 was a mixture containing cellulose nanofiber, granular carbon, and a binder, and not containing an active material. The second agglomerate of Comparative Example 2 was a mixture containing cellulose nanofiber, granular carbon, and a binder, and not containing an active material.

<Adhesiveness Test>

The strength of the adhesion of the active material-containing layer to the current collector was measured by conducting a 180-degree peel test. First, for each of the electrodes of Examples 1 to 12 and Comparative Examples 1 to 3, an unpressed electrode sample with the electrode slurry applied to one surface of the current collector and dried was prepared. The electrode sample was shaped into a rectangle having a width of 20 mm and fixed to a substrate by a double-sided tape (Scotch 665 manufactured by 3M Company), to conduct a 180-degree peel test using FUDOH Rheometer (RTC-3002D manufactured by RHEOTECH). A case where the peel strength was 10 gf or more was evaluated as "very good" (indicated by a double circle), a case where the peel strength was equal to or greater than 6 gf and less than 10 gf was evaluated as "good" (indicated by a circle), and a case where the peel strength was less than 6 gf was evaluated as "poor" (indicated by a cross mark). The results of the test are shown in Table 2.

<Evaluation of Cycle Performance>

Each electrode (20 mm×20 mm square) as a working electrode and lithium metal as a counter electrode were opposed to each other with a glass filter as a separator interposed therebetween, and were put in a three-electrode glass cell under an atmosphere of dry argon. Further, to prevent contact between the working electrode and the counter electrode, lithium metal as a reference electrode was inserted into the three-electrode glass cell.

Then, the working electrode, counter electrode, and reference electrode were connected to the terminal of the glass cell. Subsequently, an electrolytic solution was poured into the glass cell, and the glass cell was sealed with the separator, working electrode, counter electrode, and reference electrode sufficiently impregnated with the electrolytic solution, thereby preparing a cell for evaluating the respective Examples and Comparative Examples. As a solvent of the electrolytic solution, a mixed solvent obtained by mixing ethylene carbonate (EC) and diethyl carbonate (DEC) at a volume ratio of 1:2 was used. As an electrolyte of the electrolytic solution, $LiPF_6$ was used. The concentration of the electrolyte in the electrolytic solution was set to 1.0 mol/L.

When the electrodes of Examples 1 to 7, Examples 9 to 12, and Comparative Examples 1 to 3 were used, a cycle test was conducted at a temperature of 45° C. and a charge-and-discharge rate of 1 C and in a voltage range of 1.0 V (vs. $Li/Li^+$) to 3.0 V (vs. $Li/Li^+$). When the electrode of Example 8 was used, a cycle test was conducted at a temperature of 45° C. and a charge-and-discharge rate of 1 C and in a voltage range of 3.5 V (vs. $Li/Li^+$) to 4.2 V (vs. $Li/Li^+$). The discharge capacity of the first cycle and the discharge capacity of the 50th cycle were measured to determine the ratio of the discharge capacity of the 50th cycle to the discharge capacity of the first cycle as a capacity retention rate. The capacity retention rate is shown in Table 2.

The electrodes of the Examples and the Comparative Examples are collectively shown in Tables 1 and 2 below.

TABLE 1

| | Active Material Composition | Carbon Fiber | | | Granular Carbon | Cellulose Nanofiber | | | Binder | |
| | | Type | Part by Mass | Metal Element (mass %) | Part by Mass | Type | Part by Mass | Mixed Material | Type | Part by Mass |
|---|---|---|---|---|---|---|---|---|---|---|
| Example 1 | $Nb_2TiO_7$ | CNT1 | 2 | 0.02 | 4 | CLS1 | 1 | Carbon Fiber | CMC1/SBR | 2/2 |
| Example 2 | $Nb_2TiO_7$ | CNT2 | 1.5 | 0.01 | 4 | CLS1 | 1 | Carbon Fiber | CMC1/SBR | 2/2 |
| Example 3 | $Nb_2TiO_7$ | CNT3 | 0.1 | 0.5 | 4 | CLS1 | 1 | Carbon Fiber | CMC1/SBR | 2/2 |
| Example 4 | $Nb_2TiO_7$ | CNT1 | 2 | 0.02 | 4 | CLS2 | 1 | Carbon Fiber | CMC1/SBR | 2/2 |
| Example 5 | $Nb_2TiO_7$ | CNT1 | 2 | 0.02 | 4 | CLS1 | 1 | Carbon Fiber | CMC1/AC | 2/2 |
| Example 6 | $Nb_2TiO_7$ | CNT1 | 2 | 0.02 | 4 | CLS3 | 1 | Carbon Fiber | CMC1/AC | 2/2 |

TABLE 1-continued

| | Active Material Composition | Carbon Fiber Type | Carbon Fiber Part by Mass | Metal Element (mass %) | Granular Carbon Part by Mass | Cellulose Nanofiber Type | Cellulose Nanofiber Part by Mass | Cellulose Nanofiber Mixed Material | Binder Type | Binder Part by Mass |
|---|---|---|---|---|---|---|---|---|---|---|
| Example 7 | $Nb_2TiO_7$ | CNT1 | 2 | 0.02 | 4 | CLS1 | 1 | Carbon Fiber | CMC2/SBR | 2/2 |
| Example 8 | $LiMn_2O_4$ | CNT1 | 2 | 0.02 | 5 | CLS1 | 1 | Carbon Fiber | CMC1/SBR | 2/2 |
| Example 9 | $Nb_2TiO_7$ | CNT1 | 2 | 0.02 | 4 | CLS1 + CLS2 | 2 | Carbon Fiber | CMC1/SBR | 1/2 |
| Example 10 | $Nb_2TiO_7$ | CNT4 | 1 | 0.0003 | 4 | CLS1 | 1 | Carbon Fiber | CMC1/SBR | 2/2 |
| Example 11 | $Nb_2TiO_7$ | CNT5 | 2 | 0.5 | 4 | CLS1 | 1 | Carbon Fiber | CMC1/SBR | 2/2 |
| Example 12 | $Nb_2TiO_7$ | CNT1 | 2 | 0.02 | 4 | CLS1 | 0.2 | Carbon Fiber | CMC1/SBR | 2/2 |
| Comparative Example 1 | $Nb_2TiO_7$ | CNT1 | 2 | 0.02 | 4 | — | — | — | CMC1/SBR | 2/2 |
| Comparative Example 2 | $Nb_2TiO_7$ | — | — | — | 4 | CLS1 | 1 | Granular Carbon | CMC1/SBR | 2/2 |
| Comparative Example 3 | $Nb_2TiO_7$ | CNT1 | 2 | 0.02 | 4 | CLS1 | 1 | Active Material, etc. | CMC1/SBR | 2/2 |

Table 1 shows the composition of the active material in the column labeled "Composition" under the heading "Active Material". Table 1 shows the type of carbon fiber, the content of the carbon fiber with respect to 100 parts by mass of the active material, and the content of iron and cobalt in the columns labeled "Type", "Part by Mass", and "Metal Element", respectively, under the heading "Carbon Fiber". Table 1 shows the content of the granular carbon with respect to 100 parts by mass of the active material in the column labeled "Part by Mass" under the heading "Granular Carbon". Table 1 shows the type of the cellulose nanofiber, the content of the cellulose nanofiber with respect to 100 parts by mass of the active material, and the material first mixed with the cellulose nanofiber in the columns labeled "Type", "Part by Mass", and "Mixed Material", respectively, under the heading "Cellulose Nanofiber".

TABLE 2

| | First Agglomerate on Second Surface (count/mm$^2$) | Second Agglomerate on First Surface (count/mm$^2$) | Adhesiveness Evaluation | Capacity Retention Rate (%) |
|---|---|---|---|---|
| Example 1 | 1100 | 5800 | ⊚ | 87.4 |
| Example 2 | 1300 | 6400 | ⊚ | 89.5 |
| Example 3 | 900 | 6200 | ⊚ | 90.1 |
| Example 4 | 1900 | 7000 | ○ | 83.9 |
| Example 5 | 1300 | 6200 | ⊚ | 87.8 |
| Example 6 | 1600 | 3800 | ○ | 82.1 |
| Example 7 | 1200 | 5500 | ○ | 84.5 |
| Example 8 | 1600 | 4800 | ⊚ | 99.1 |
| Example 9 | 1500 | 6800 | ⊚ | 88.2 |
| Example 10 | 1100 | 5600 | ○ | 87.6 |
| Example 11 | 1000 | 7800 | ⊚ | 88.3 |
| Example 12 | 1400 | 5300 | ○ | 86.7 |
| Comparative Example 1 | 4700 | 4300 | x | 79.4 |
| Comparative Example 2 | 400 | 4700 | ⊚ | 55 |
| Comparative Example 3 | 11000 | 7800 | ○ | 69.4 |

Table 2 shows the number of first agglomerates on the second surface per mm$^2$ and the number of second agglomerates on the first surface per mm$^2$ in the columns labeled "First Agglomerate on Second Surface" and "Second Agglomerate on First Surface". Table 2 also shows the evaluation results of the adhesiveness test and the cycle test in the columns labeled "Adhesiveness" and "Capacity Retention Rate".

As is apparent from the comparison between Examples 1 to 12 and Comparative Examples 1 to 3, the electrodes in which the number of first agglomerates on the second surface was not greater than 2000/mm$^2$ and which included both carbon fiber and cellulose fiber exhibited excellent adhesiveness and cycle performance, as compared to the electrodes that failed to satisfy at least one of these requirements.

As shown in Examples 1 and 8, even when the type of the active material was changed, excellent cycle performance was achieved. As shown in Examples 1 to 3, 10, and 11, even when the type of the carbon fiber was changed, excellent cycle performance was achieved. As shown in Examples 1, 4, 6, and 9, even when the type of the cellulose nanofiber was changed, excellent cycle performance was achieved. As shown in Examples 1 and 7, even when the type of the binder was changed, excellent cycle performance was achieved.

Figure 12:
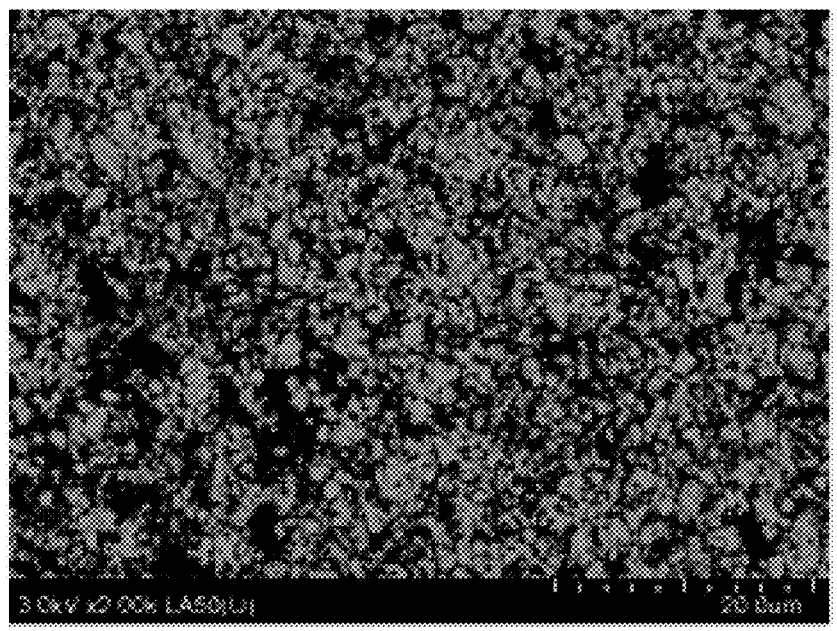
FIG. 12 is a scanning electron micrograph of an active material-containing layer of an electrode according to Example 1.
Figure 13:
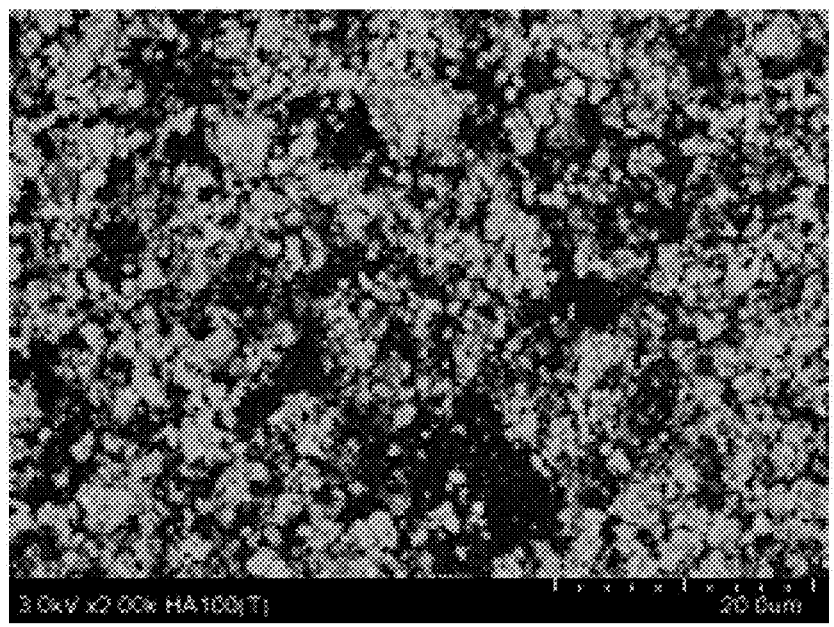
FIG. 13 is a scanning electron micrograph of an active material-containing layer of an electrode according to Comparative Example 1.

A scanning electron micrograph (FIG. 12) of a surface corresponding to the second surface of the active material-containing layer of the electrode of Example 1 and a scanning electron micrograph (FIG. 13) of a surface corresponding to the second surface of the active material-containing layer of the electrode of Comparative Example 1 were compared. In Example 1, agglomeration of the conductive agent hardly occurred on the second surface of the active material-containing layer, and the conductive agent was uniformly dispersed. On the other hand, in Comparative Example 1, agglomeration of the conductive agent occurred on the second surface of the active material-containing layer to a high degree. An observation performed by a scanning electron microscope on the other Examples found a similar tendency to that of Example 1.

The electrode according to at least one of the embodiments described above includes an active material-containing layer that contains an active material, carbon fiber, and cellulose fiber, wherein the number of first agglomerates on the second surface is 2000/mm² or less. A secondary battery which adopts this electrode can exhibit excellent cycle performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed:

1. An electrode comprising:
   a current collector; and
   an active material-containing layer supported on the current collector and comprising an active material comprising niobium-titanium composite oxide, a conductive agent, cellulose fiber, a binder, first agglomerates, and second agglomerates, and the conductive agent comprising carbon fiber, wherein:
   the active material-containing layer comprises a first surface brought into contact with the current collector, and a second surface which is a reverse face of the first surface; and
   400/mm² to 2000/mm² of the first agglomerates are present on the second surface, the first agglomerates comprises the carbon fiber and the cellulose fiber, do not comprise the active material, and have a longest diameter of 5 μm or more and a shortest diameter of 1 μm or more,
   wherein 4500/mm² or more of the second agglomerates are present on the first surface; and the second agglomerates comprise the carbon fiber and the cellulose fiber, do not comprise the active material, and have a longest diameter of 2 μm or more and a shortest diameter of 1 μm or more, and
   wherein the binder is at least one selected from the group consisting of styrene-butadiene rubber, styrene-acrylate resins, acrylic resins, urethane resins, polytetrafluoroethylene, fluororubber, polyimide resin, core-shell binder, and carboxymethyl cellulose.

2. The electrode according to claim 1, wherein 4500/mm² to 10000/mm² of the second agglomerates are present on the first surface.

3. The electrode according to claim 1, wherein the cellulose fiber has an average diameter of 1 nm or more and 80 nm or less.

4. The electrode according to claim 1, wherein the cellulose fiber is TEMPO-oxidized cellulose nanofiber.

5. The electrode according to claim 1, wherein the carbon fiber has an average diameter of 1 nm or more and 50 nm or less.

6. The electrode according to claim 1, wherein the carbon fiber has an average fiber length of 1 μm or more and 200 μm or less.

7. The electrode according to claim 1, wherein the carbon fiber comprises at least one metal element selected from the group consisting of Fe, Co, Ni, and Zn, in an amount of 0.0001 mass % or more and 5 mass % or less.

8. A secondary battery comprising a positive electrode, a negative electrode, and an electrolyte,
   wherein at least one of the positive electrode or the negative electrode is the electrode according to claim 1.

9. A battery pack comprising the secondary battery according to claim 8.

10. The battery pack according to claim 9, further comprising:
    an external power distribution terminal; and
    a protective circuit.

11. The battery pack according to claim 9, comprising plural of the secondary battery, the secondary batteries being electrically connected in series, in parallel, or in a combination of in-series and in-parallel.

12. A vehicle comprising the battery pack according to claim 9.

13. The vehicle according to claim 12, wherein the battery pack is configured to recover regenerative energy of motive force of the vehicle.

14. The electrode according to claim 1, wherein the current collector is made of an aluminum foil or an aluminum alloy foil.

* * * * *